US008055218B2

(12) United States Patent
Tanaka et al.

(10) Patent No.: US 8,055,218 B2
(45) Date of Patent: Nov. 8, 2011

(54) WIRELESS TRANSMITTER CIRCUIT AND TRANSCEIVER USING THE SAME

(75) Inventors: Satoshi Tanaka, Kokubunji (JP); Yukinori Akamine, Kokubunji (JP); Manabu Kawabe, Hachioji (JP); Yasuyuki Kimura, Maebashi (JP); Takao Okazaki, Hamura (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 836 days.

(21) Appl. No.: 11/158,094

(22) Filed: Jun. 22, 2005

(65) Prior Publication Data
US 2005/0287964 A1 Dec. 29, 2005

(30) Foreign Application Priority Data

Jun. 23, 2004 (JP) ................................. 2004-184779

(51) Int. Cl.
*H01Q 11/12* (2006.01)
*H04B 1/04* (2006.01)
(52) U.S. Cl. ..................... 455/118; 455/119; 455/114.1; 455/553.1; 455/63.1
(58) Field of Classification Search .................. 455/118, 455/119, 552.1, 553.1, 63.1, 84–88, 114.1, 455/114.2, 551
See application file for complete search history.

(56) References Cited

U.S. PATENT DOCUMENTS

| 6,150,890 | A | * | 11/2000 | Damgaard et al. | 331/14 |
| 6,181,212 | B1 | * | 1/2001 | Khoini-Poorfard et al. | 331/16 |
| 6,226,499 | B1 | * | 5/2001 | Nakatani et al. | 455/78 |
| 6,269,253 | B1 | * | 7/2001 | Maegawa et al. | 455/552.1 |
| 6,671,500 | B2 | * | 12/2003 | Damgaard et al. | 455/118 |
| 6,868,261 | B2 | * | 3/2005 | Shi et al. | 455/114.2 |
| 6,920,182 | B2 | * | 7/2005 | Bolton, Jr. | 375/247 |
| 6,927,716 | B2 | * | 8/2005 | Keaveney et al. | 341/143 |
| 6,933,798 | B2 | * | 8/2005 | Hammes et al. | 332/127 |
| 6,954,161 | B2 | * | 10/2005 | Inukai et al. | 341/143 |
| 7,363,013 | B2 | * | 4/2008 | Kuo et al. | 455/112 |
| 2003/0203720 | A1 | * | 10/2003 | Oosawa et al. | 455/84 |
| 2003/0235261 | A1 | * | 12/2003 | Patana | 375/376 |

(Continued)

FOREIGN PATENT DOCUMENTS

JP 2000-049646 A 2/2000

(Continued)

OTHER PUBLICATIONS

S. Tanaka et al., "GSM/DCS1800 Dual Band Direct-Conversion Transceiver IC with a DC Offset Calibration System," Proceedings of the 27$^{th}$ European Solid-State Circuits Conference, 2001, pp. 492-495.

*Primary Examiner* — Edward Urban
*Assistant Examiner* — Rui Hu
(74) *Attorney, Agent, or Firm* — Miles & Stockbridge P.C.

(57) ABSTRACT

This invention provides a wireless transmitter circuit for mobile communication apparatus and this circuit can be configured with fewer components and is suitable for downsizing. A single PLL synthesizer serves as both RF frequency band PLL and IF frequency band PLL among three oscillators for TX, RX and IF frequency bands, which have been required in conventional mobile communication apparatus. The number of necessary oscillators occupying a large area within a chip is reduced and the number of components is decreased. Specifically, circuitry is arranged to generate local oscillation signals for RF and IF frequency bands by frequency dividing the output of a VCO of the RF frequency band PLL.

7 Claims, 19 Drawing Sheets

U.S. PATENT DOCUMENTS

| | | | |
|---|---|---|---|
| 2005/0017776 A1* | 1/2005 | Keaveney et al. | 327/157 |
| 2005/0266805 A1* | 12/2005 | Jensen | 455/82 |
| 2005/0280473 A1* | 12/2005 | Puma et al. | 331/16 |
| 2006/0192620 A1* | 8/2006 | Beaulaton et al. | 331/1 A |

FOREIGN PATENT DOCUMENTS

| | | |
|---|---|---|
| JP | 2002-152044 | 5/2002 |
| JP | 2003-528529 T | 9/2003 |
| WO | WO 01/71934 A1 | 9/2001 |

* cited by examiner

FIG. 12

| CH | f (MHz) | Ni | Nf | THEO | Σ Δ (min) | Σ Δ (max) | TM ERR (max) | TM ERR (min) |
|---|---|---|---|---|---|---|---|---|
| 1 | 890.2 | 34 | 31 | 2225.5 | 2225 | 2226 | 0.5 | -0.5 |
| 2 | 890.4 | 34 | 32 | 2226.0 | 2226 | 2226 | 0.0 | 0.0 |
| 3 | 890.6 | 34 | 33 | 2226.5 | 2226 | 2227 | 0.5 | -0.5 |
| 4 | 890.8 | 34 | 34 | 2227.0 | 2227 | 2227 | 0.0 | 0.0 |
| 5 | 891.0 | 34 | 35 | 2227.5 | 2227 | 2228 | 0.5 | -0.5 |
| 6 | 891.2 | 34 | 36 | 2228.0 | 2228 | 2228 | 0.0 | 0.0 |
| 7 | 891.4 | 34 | 37 | 2228.5 | 2228 | 2229 | 0.5 | -0.5 |
| 8 | 891.6 | 34 | 38 | 2229.0 | 2229 | 2229 | 0.0 | 0.0 |
| 9 | 891.8 | 34 | 39 | 2229.5 | 2229 | 2230 | 0.5 | -0.5 |
| 32 | 896.4 | 34 | 62 | 2241.0 | 2241 | 2241 | 0.0 | 0.0 |
| 33 | 896.6 | 34 | 63 | 2241.5 | 2241 | 2242 | 0.5 | -0.5 |
| 34 | 896.8 | 34 | 64 | 2242.0 | 2242 | 2242 | 0.0 | 0.0 |
| 35 | 897.0 | 35 | -65 | 2242.5 | 2242 | 2243 | 0.5 | -0.5 |
| 36 | 897.2 | 35 | -64 | 2243.0 | 2243 | 2243 | 0.0 | 0.0 |
| 37 | 897.4 | 35 | -63 | 2243.5 | 2243 | 2244 | 0.5 | -0.5 |
| 97 | 909.4 | 25 | -3 | 2273.5 | 2273 | 2274 | 0.5 | -0.5 |
| 98 | 909.6 | 35 | -2 | 2274.0 | 2274 | 2274 | 0.0 | 0.0 |
| 99 | 909.8 | 35 | -1 | 2274.5 | 2274 | 2275 | 0.5 | -0.5 |
| 100 | 910.0 | 35 | 0 | 2275.0 | 2275 | 2275 | 0.0 | 0.0 |
| 101 | 910.2 | 35 | 1 | 2275.5 | 2275 | 2276 | 0.5 | -0.5 |
| 102 | 910.4 | 35 | 2 | 2276.0 | 2276 | 2276 | 0.0 | 0.0 |
| 103 | 910.6 | 35 | 3 | 2276.5 | 2276 | 2277 | 0.5 | -0.5 |
| 121 | 914.2 | 35 | 21 | 2285.5 | 2285 | 2286 | 0.5 | -0.5 |
| 122 | 914.4 | 35 | 22 | 2286.0 | 2286 | 2286 | 0.0 | 0.0 |
| 123 | 914.6 | 35 | 23 | 2286.5 | 2286 | 2287 | 0.5 | -0.5 |
| 124 | 914.8 | 35 | 24 | 2287.0 | 2287 | 2287 | 0.0 | 0.0 |

US 8,055,218 B2

WIRELESS TRANSMITTER CIRCUIT AND TRANSCEIVER USING THE SAME

CLAIM OF PRIORITY

The present application claims priority from Japanese application JP 2004-184779 filed on Jun. 23, 2004, the content of which is hereby incorporated by reference into this application.

FIELD OF THE INVENTION

The present invention relates to a transmitter circuit for mobile communication apparatus and, in particular, to a wireless transmitter circuit and a transceiver using that circuit in a transmitter section suitable for large-scale integration.

BACKGROUND OF THE INVENTION

With explosive growth of mobile communication apparatus, there is a strong demand for smaller and less costly wireless apparatus. Consequently, application of a transceiver integrated circuit (IC) with enhanced integration is hoped for. One example of the transceiver IC with improved integration by prior art is a direct-conversion transceiver IC introduced by Hitachi, Ltd. in 2001 (see non-patent document 1). This uses an offset PLL transmitter circuit and, in the transmitter, there are an RF frequency band phase-locked loop (PLL), an intermediate frequency (IF) band PLL, and a transmission oscillator; altogether three oscillation circuits and PLL circuits including oscillators.

A mobile phone configuration that uses a modulation type fractional divider PLL frequency synthesizer in which a digital dither circuit is provided between a digital input and a delta-sigma ($\Delta\Sigma$) modulator to supply a digital output which discretely changes from the digital input with its time-average corresponding to the digital input to the delta-sigma ($\Delta\Sigma$) modulator is known (e.g., see patent document 1). Since the "delta-sigma modulator" is generally called a "sigma-delta ($\Sigma\Delta$) modulator," the term "sigma-delta ($\Sigma\Delta$) modulator" will be used hereinafter.

[Patent document 1] Japanese Patent Laid-Open No. 2002-152044
[Non-patent document 1] S. Tanaka et al., "GSM/DCS1800 Dual Band Direct-Conversion Transceiver IC," Proceedings of the 27th European Solid-State Circuits Conference pp. 492-495, 2001

SUMMARY OF THE INVENTION

The former prior art example requires altogether three oscillators for TX (transmitting frequency), RF (radio frequency), and IF frequency. When these oscillators are integrated into an IC chip, because of low noise requirement for each oscillator, an inductor occupying a large area on the IC is required per oscillator and the IC size is difficult to be reduced.

In the latter prior art example, for example, a local oscillator circuit configuration to generate both IF and RF local oscillation signals using one PLL is disclosed, but no consideration is taken for spurious generated by the arrangement for IF and RF. The document (patent document 1) on this prior art example also refers to a sigma-delta $\Sigma\Delta$ synthesizer preferable for use in this local oscillator and describes the need of a dither circuit to solve a spurious problem proper to the $\Sigma\Delta$ synthesizer. However, it provides no description of a concrete configuration to avoid the spurious problem and enable more downsizing.

Then, an object of the present invention is to provide a transmitter circuit that avoids the spurious problem, is suitable for downsizing, can be configured with fewer components, and allows for compact integration.

Another object of the invention is to provide a transceiver using the above transmitter circuit.

An example of typical means of the present invention will be presented below. A transmitter circuit according to the present invention comprises a first frequency-generating circuit, a first frequency-converting circuit, a second frequency-converting circuit to which output of the first frequency-converting circuit is input, and a first divider, characterized in that output of the first frequency-generating circuit is supplied via the first divider to the first frequency-converting circuit as a local oscillation signal for the first frequency-converting circuit, output of the first frequency-generating circuit is supplied directly or via a second divider to the second frequency-converting circuit as a local oscillation signal for the second frequency-converting circuit, and a frequency division factor of the first divider is set to a variable number. As for the above components, referring to FIG. 1, the first frequency-generating circuit corresponds to a synthesizer SS, the first frequency-converting circuit corresponds to a quadrature modulator 8, the second frequency-converting circuit corresponds to an offset PLL, the first divider corresponds to dividers 30, 31, and the second divider corresponds to dividers 27, 29.

BRIEF DESCRIPTION OF THE DRAWINGS

FIG. 12 is a table to demonstrate the effect of calibration when the third embodiment of the invention is applied to major GSM channels.

DETAILED DESCRIPTION OF THE PREFERRED EMBODIMENTS

Embodiments of the present invention will now be described in detail with reference to the accompanying drawings.

Embodiment 1

Figure 1:
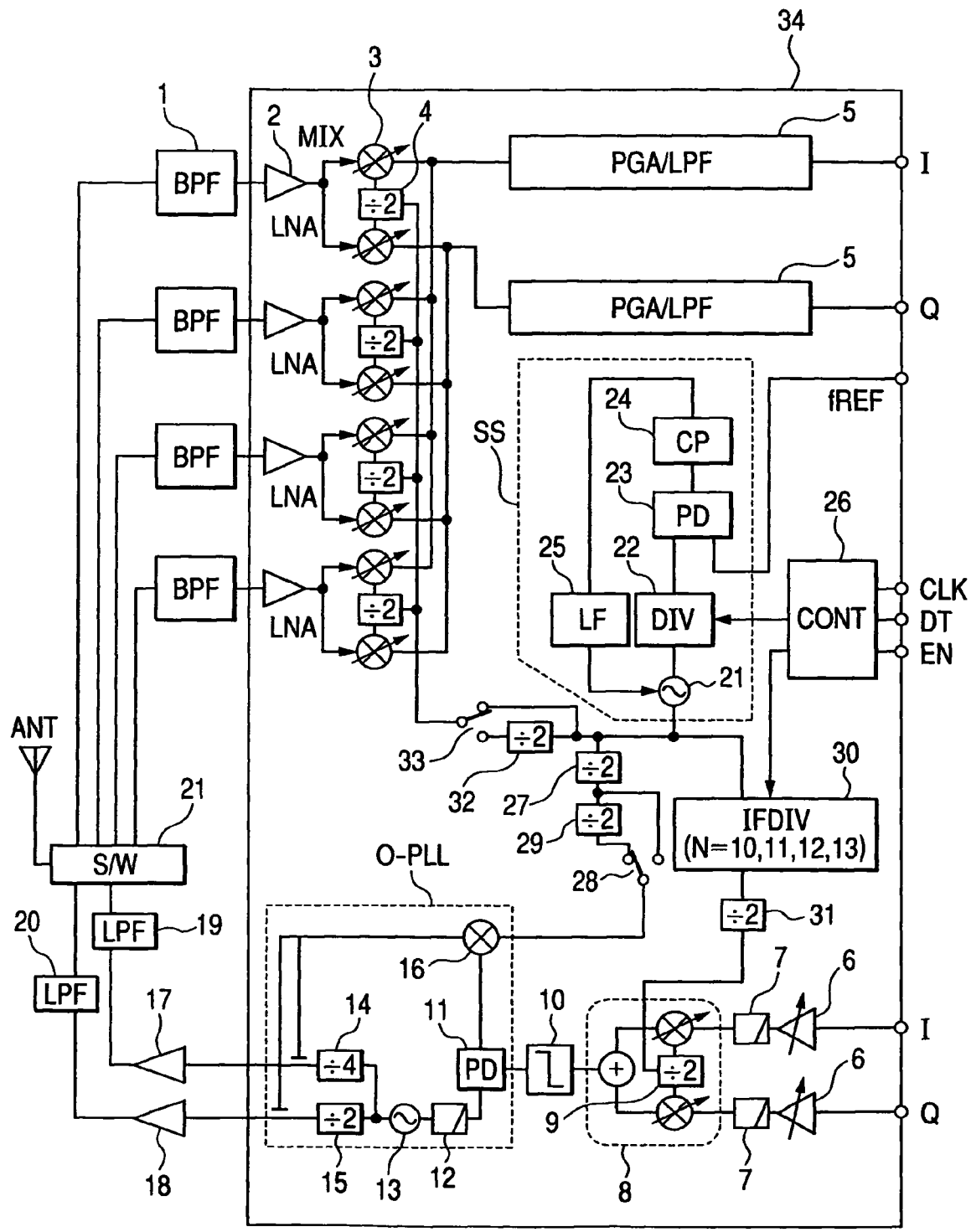
FIG. 1 is a diagram showing a transceiver circuit configuration of a first embodiment of the present invention.

A first embodiment of the present invention will be described with FIGS. 1 through 4. FIG. 1 shows an RFIC configuration in which a transceiver circuit using a wireless transmitter circuit of the present invention is integrated. This RFIC 34 is designed to support four frequency bands: GSM850, GSM900, DCS1800, and PCS1900.

GSM850 uses a transmitting band of 824-849 MHz and a receiving band of 869-894 MHz. GSM900 uses a transmitting band of 880-915 MHz and a receiving band of 925-960 MHz. DCS1800 uses a transmitting band of 1710-1785 MHz and a receiving band of 1805-1880 MHz. PCS1900 uses a transmitting band of 1850-1910 MHz and a receiving band of 1930-1990 MHz.

A received signal is input via a band pass filter (BPF) 1 to a low noise amplifier (LNA) 2 on the IC which is a filter circuit to remove interference introduced from the antenna ANT. The signal amplified by the LNA is frequency converted into two I and Q baseband signals by mixers 3. The baseband signals respectively pass through PGA/LPF circuits 5 and are output as I and Q output signals from the RFIC 34. The PGA/LPF circuit 5 consists of a programmable gain amplifier (PGA) and a low-pass filter (LPF) for removing interference from the frequency converted signal.

A local signal which is input to the mixers 3 is generated by frequency-dividing an output signal of a voltage controlled oscillator (VCO) 21. In the case of GSM850 and GSM900, the mixers 3 are driven by the VCO output signal with a frequency divided by 4, that is, the frequency is divided by a divide-by-2 divider 32 selected by a switch 33 and further divided by a divide-by-2 divider 4. In the case of DCS1800 and PCS1900, the mixers 3 are driven by the VCO output signal with a frequency divided by 2, that is, the frequency is divided by only the divide-by-2 divider 4 and the divide-by-2 divider 32 is deselected by the switch 33. By thus using the dividers, local oscillation signals for I and Q with a phase shift of exactly 90 degrees can be generated. The VCO 21 operates under stable frequency control by a synthesizer SS comprised of a variable divider (DIV) 22, a phase discriminator (PD) 23, a charge pump circuit (CP) 24, and a loop filter 25. A frequency division factor of the variable divider 22 is set by a control circuit (CONT) 26 and the VCO frequency can be controlled to a desired oscillation frequency.

A transmitter circuit modulates transmit signals by GMSK (Gaussian filtered Minimum Shift Keying) modulation and input signals are input through two I and Q paths. The input signals go through attenuators 6 for signal level matching with a quadrature modulator 8 at the following stage and low-pass filters 7 to reduce out-of-band noise and are applied to the quadrature modulator 8. An IF signal that is output from the quadrature modulator passes through a limiter circuit 10 and drives a phase discriminator 11. Output of the phase discriminator passes through a loop filter 12 and controls a control voltage of a transmitting VCO 13. To the output side of the VCO 13, a divide-by-4 divider 14 and a divide-by-2 divider 15 are attached.

Transmit signals in GSM850 and GSM900 bands are output by the divide-by-4 divider 14 and transmit signals in DCS1800 and PCS1900 bands are output by the divide-by-2 divider 15. A transmit signal is frequency converted into an IF signal band by a mixer 16, an error from the input IF signal is detected by the phase discriminator 11, and the signal is fed back to the VCO 13. In consequence, a GMSK modulated signal with a predetermined center frequency can be generated at the output side of each of the dividers 14, 15. Output of the divide-by-4 divider 14 is amplified by a power amplifier 17 (for GSM850 and 900) and output of the divide-by-2 divider 15 is amplified by a power amplifier 18 (for DCS1800 and PCS1900). After harmonics are removed from the amplified transmit signals by low-pass filters (LPFs) 19, 20, respectively, the transmit signals are output via a switch S/W 21 to the antenna.

This type of transmitter circuit is known as an offset PLL circuit (O-PLL) and this circuit generally requires an IF local oscillation signal to drive the quadrature modulator and an RF local oscillation signal to drive the mixer in the PLL feedback loop. As noted above, in the prior art, these signals are generated by two separate synthesizers. However, in the present embodiment, these signals are generated by one synthesizer, so that the IC will be downsized.

The VCO 21 that is used to generate local oscillation signals in the receiver circuit is also used to generate RF and IF signals for transmission. RF local oscillation signals are generated by frequency-dividing the output of the VCO 21. Specifically, these signals for GSM850 and 900 are generated by dividing the VCO output frequency by four, using two divide-by-2 dividers 27, 29 selected by a switch 28. These signals for DCS1800 and 1900 are generated by dividing that frequency by two, using only one divide-by-2 divider 27 selected by the switch 28.

On the other hand, IF local oscillation signals are generated by dividing the VCO 21 output frequency with a variable divider (IFDIV) 30. In general, the duty ratio of the variable divider output is not 50%. Therefore, by dividing the output by four, using two divide-by-2 dividers 31, 9, local oscillation signals for I and Q with a phase shift of exactly 90 degrees are generated.

The reason why the variable divider 30 is used to generate IF local oscillation signals in this embodiment will be described with FIG. 2. In the present embodiment, transmission frequency is denoted by fTx, VCO 21 oscillation frequency fVCO, RF local oscillation signal frequency fRF, IF local oscillation signal frequency fIF, and reference frequency fREF.

$$fTX = fRF - fIF \quad (1)$$

$$fRF = fVCO/(2*m) \quad (2)$$

$$fI = fVCO/(4*N) \quad (3)$$

where, m=1 for DCS and PCS and m=2 for GSM850 and 900, and N is a variable frequency division factor.

From the above equations (1) to (3), the following equations (4) and (5) are derived.

$$fRF = fIF*2N/m \quad (4)$$

$$fTX = fIF*(2N/m-1) \quad (5)$$

Equations (4) and (5) indicate that, even if transmission frequency fTX changes, there are always an integral ratio between transmission frequency fTX and IF frequency fIF and an integral ratio between RF local oscillation frequency fRF and IF frequency fIF. Because harmonic spurious due to IF signals corresponds to a transmission frequency band in which a large signal is generated, a spurious problem is not presented.

On the other hand, harmonics of reference frequency fREF is constant without regard to frequency setting. Some transmission frequency setting may cause spurious to occur near the transmission center frequency. FIG. 2 shows this phenomenon in the case of GSM900 as an example. The abscissa represents transmission frequency fTX and the ordinate represents RF local oscillation frequency fRF. If reference frequency fREF=26 MHz, the frequencies of harmonics equaling the reference frequency multiplied by a factor of 37, 38, and 39, respectively, and the frequencies of RF signals generated with variable frequency division factor N=10 and N=11, respectively, are plotted.

Assuming that N is fixed to 11, the RF signal line (N=11) meets the line of a harmonic having 26 MHz multiplied by a factor of 38 at or near 898 MHz. Therefore, transmission spurious is liable to occur in the vicinity of this frequency. To avoid this, by changing N from 11 to 10 at transmission frequency fTX=895 MHz and from 10 to 11 at fTX=910 MHz, the RF local oscillation frequency fRF is separated from the harmonic frequency of reference frequency fREF. Roughly, this separation is set for 3-5 MHz here, as an offset PLL operates in a band of 1 MHz or above.

Figure 2:
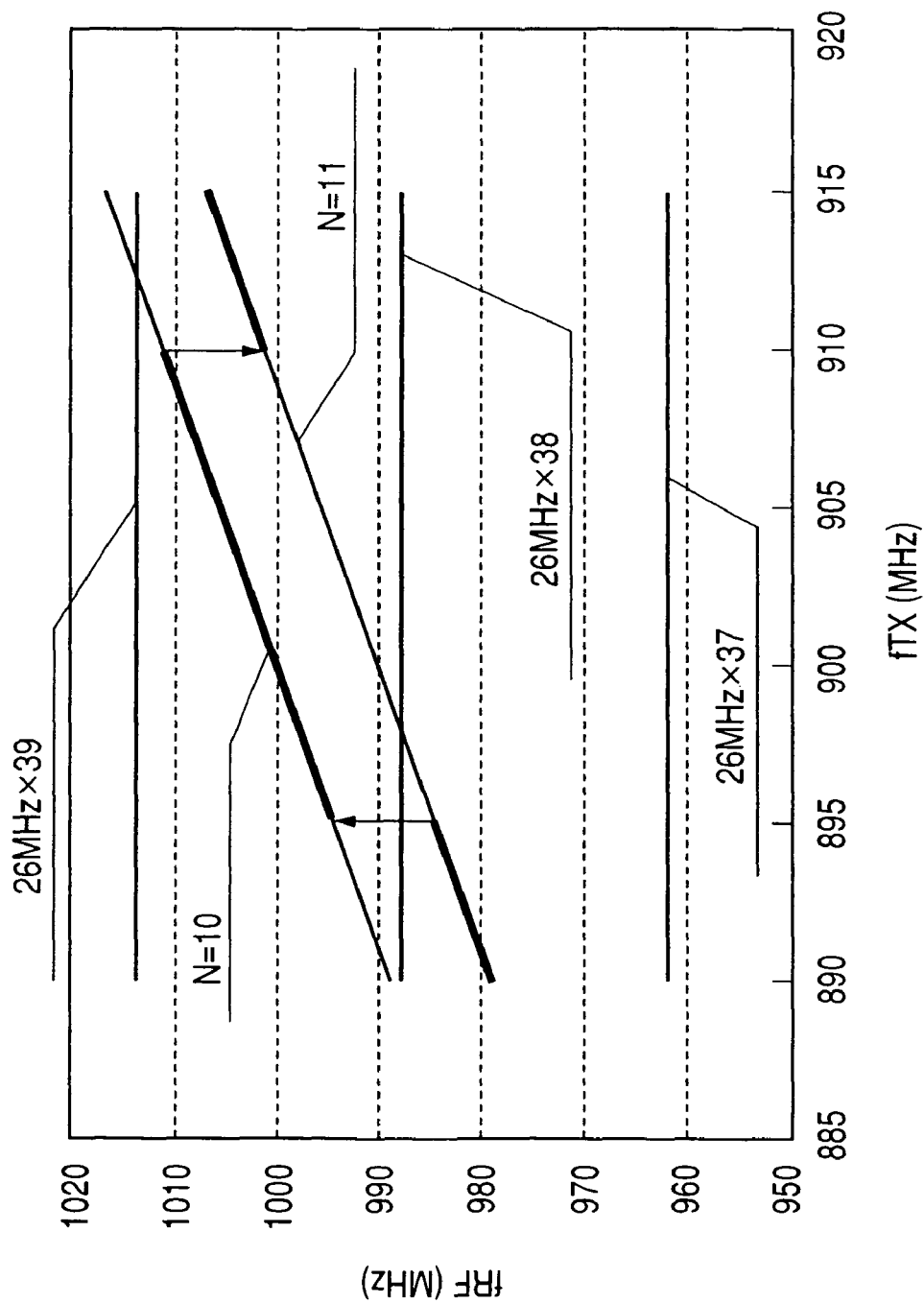
FIG. 2 is a graph to explain control of a frequency division ratio in the first embodiment of the invention.
Figure 3:
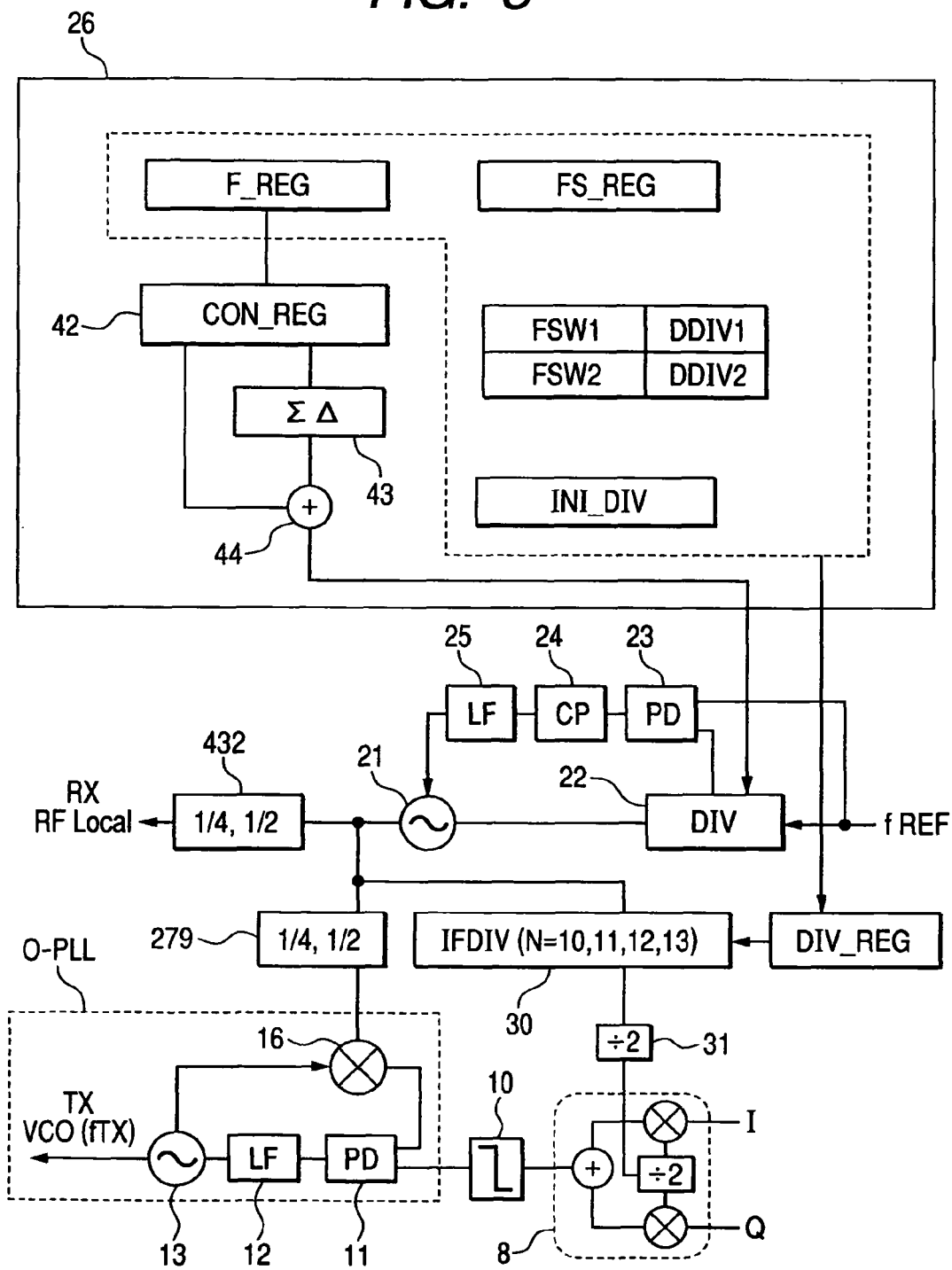
FIG. 3 is a diagram showing an example of a control section configuration involved in the first embodiment of the invention.

FIG. 3 is a block circuit diagram showing detailed configuration of the control circuit 26 that realizes changing the variable frequency division factor N explained with FIG. 2. In FIG. 3, the transceiver components corresponding to those shown in FIG. 1 are assigned the same reference numbers. However, a divider 432 is a simplified representation in a block of a circuit consisting of the divide-by-2 dividers 4, 32, and the switch 33 for switching between division-by-2 and division-by-4. This circuit is used to generate local oscillation signals to be input to the mixers 3 from the output of the VCO 21, according to the frequency band in use which may be GSM, DCS, etc., as described for FIG. 1. A divider 279 is a simplified representation in a block of a circuit consisting of the divide-by-2 dividers 27, 29, and the switch 28 for switching between division-by-2 and division-by-4. This circuit is used to generate RF local oscillation signals from the output of the VCO 21. Dividers 432 and 279 in FIG. 5 and FIG. 20, which will be described later, are the same representations.

The frequency division factor of the various divider 22 included in the synthesizer SS is set by using a time-changing signal generated by a sigma-delta (ΣΔ) modulator 43. In a frequency division ratio setting register (CON_REG) 42, data for setting a frequency pitch for integral multiplication of reference frequency fREF and data for setting an input to the sigma-delta (ΣΔ) modulator 43 are stored. The former data is used to directly control the variable divider 22 via an adder 44. The latter data is converted into a time-changing signal with a low bit length by the sigma-delta (ΣΔ) modulator 43 and this signal is supplied to control the variable divider 22 via the adder 44. This type of PLL circuit including the variable divider whose frequency division factor is changed over time is called a fractional PLL.

Figure 4:
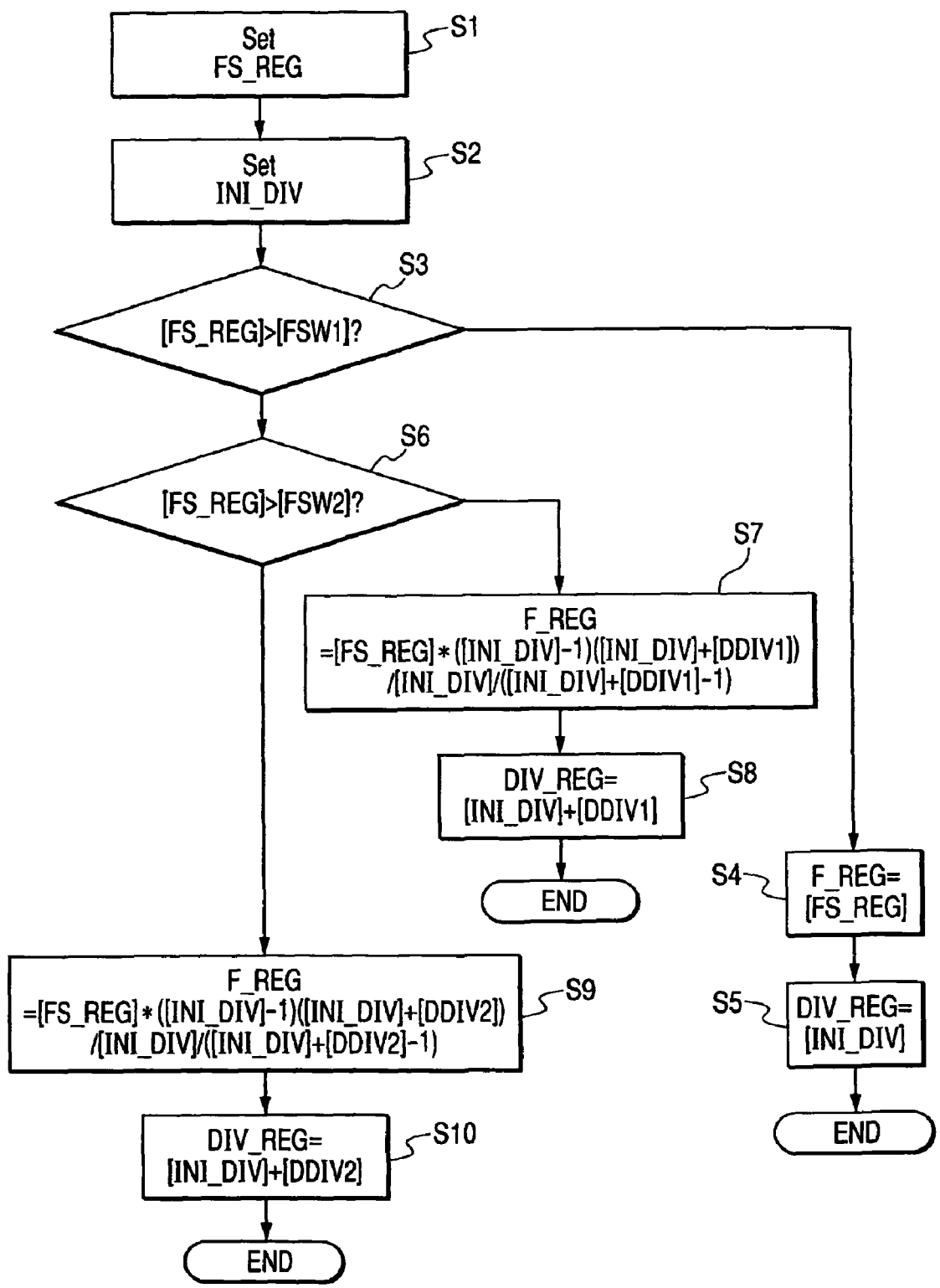
FIG. 4 is a flowchart illustrating the operation of a control part in the first embodiment of the invention.

To change the value of variable frequency division factor N as required, a frequency setting register F_REG, an initial frequency setting register FS_REG, first and second switching frequency registers FSW1 and FSW2, first and second switching value setting registers DDIV1 and DDIV2, an initial IF division ratio setting register INI_DIV, and an IF division ratio setting register DIV_REG are used. Operation for this setting change is performed by the following procedure which is illustrated in FIG. 4.

First, in step S1, data is set in the initial frequency setting register FS_REG.

In step S2, data is set in the initial IF division ratio setting register INI_DIV.

In step S3, the data set in the initial frequency setting register FS_REG is compared with the data in the first switching frequency register FSW1. If the result of the comparison is true, step S6 is executed; if the result is false, step S4 is executed.

In step S4, the data in the initial frequency setting register FS_REG is stored into the frequency setting register F_REG.

Then, the procedure proceeds to step S5 where the data in the initial IF division ratio setting register INI_DIV is stored into the IF division ratio setting register DIV_REG and the operation terminates.

If the procedure proceeds to step S6, the data set in the initial frequency setting register FS_REG is compared with the data in the second switching frequency register FSW2. If the result of the comparison is true, step S9 is executed; if the result is false, step S7 is executed.

In step S7, a calculation is executed and the result is stored into the frequency setting register F_REG.

Next, in step S8, the sum of the data in the initial IF division ratio setting register INI_DIV and the data in the first switching value setting register DDIV1 is stored into the IF division ratio setting register DIV_REG and the operation terminates.

In step S9, a calculation is executed and the result is stored into the frequency setting register F_REG.

In step S10, the sum of the data in the initial IF division ratio setting register INI_DIV and the data in the second switching value setting register DDIV2 is stored into the IF division ratio setting register DIV_REG and the operation terminates.

The operation described above is an example and the essence of the present invention resides in variable setting the frequency division factor of the divider for generating IF local oscillation signals.

Embodiment 2

A second embodiment of the present invention will be described with FIGS. 5 and 6. This embodiment is an example where the operation illustrated in FIG. 4, which is performed within the control circuit 26 in the first embodiment, is performed by a baseband LSI (BBLSI) 59.

Figure 5:
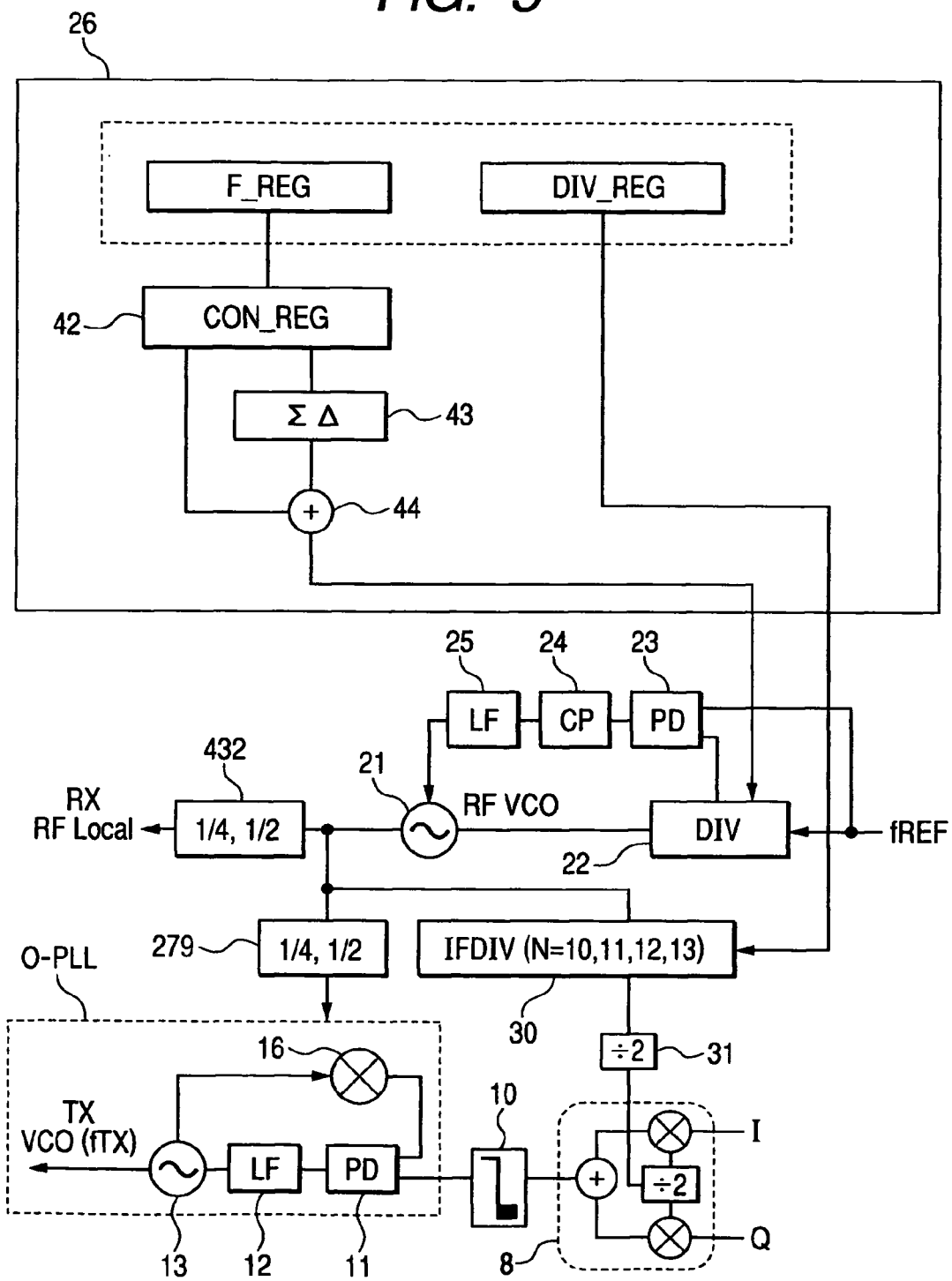
FIG. 5 is a diagram showing an example of a configuration of the control part according to a second embodiment of the invention.

FIG. 5 is a diagram corresponds to FIG. 3 for the first embodiment and the same components assigned the same reference numbers and their explanation is not repeated. In this embodiment, unlike the configuration shown in FIG. 3, the IF division ratio setting register DIV_REG is provided within the control circuit 26. Instead, the initial frequency setting register FS_REG, first and second switching frequency registers FSW1, FSW2, first and second switching value setting registers DDIV1 and DDIV2, and initial IF division ratio setting register INI_DIV are removed from the control circuit 26.

Figure 6:
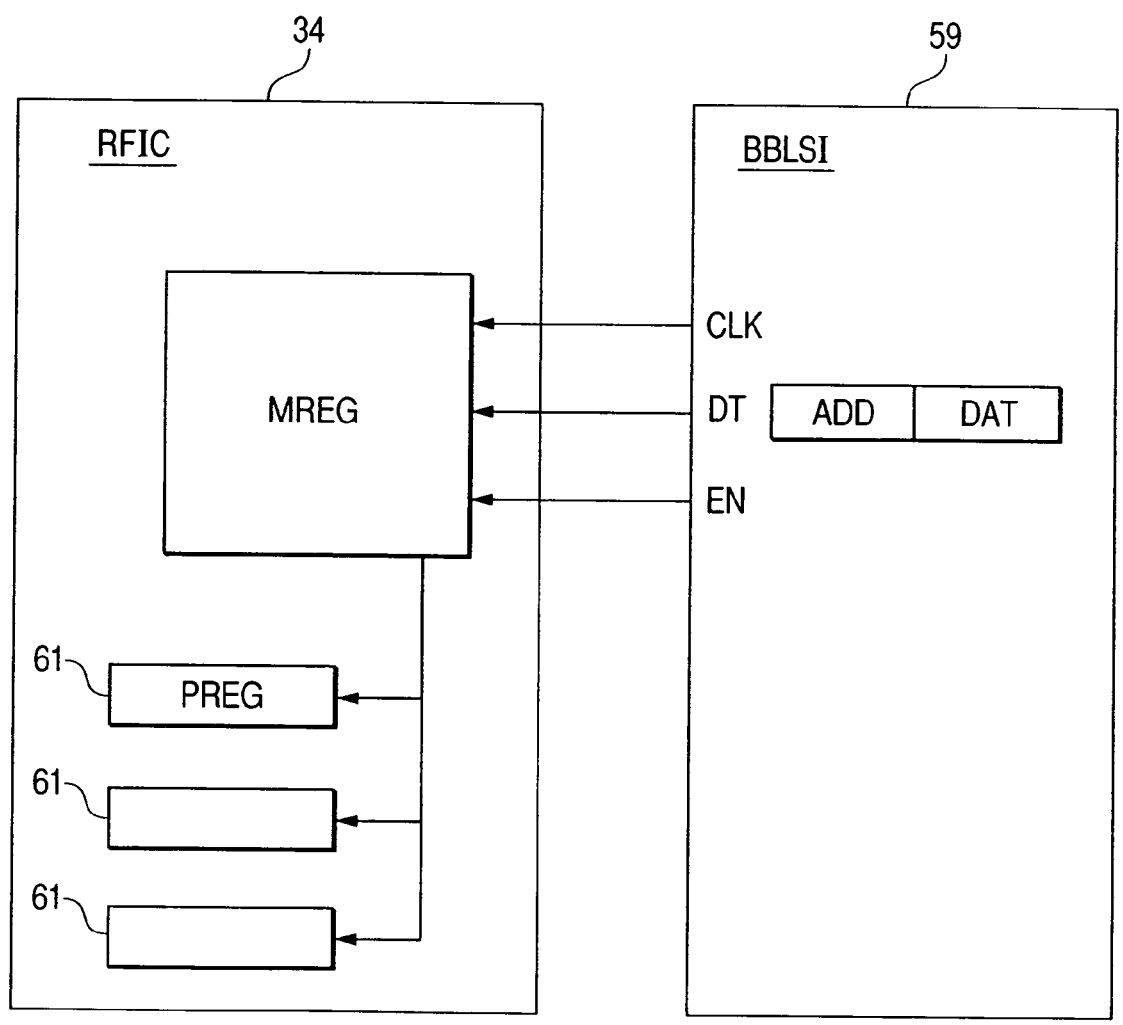
FIG. 6 is a diagram showing a part of RFIC receiving control data from a baseband in the second embodiment of the invention.

FIG. 6 is a diagram showing transfer of control data between the RFIC 34 and the BBLSI 59. For storing data that is transferred between the RFIC 34 and the BBLSI 59, a main data register MREG and specific data registers PREG 61 are provided in the RFIC 34. In the main data register MREG, clock signal CLK, data DT, and enable signal EN transferred from the BBLSI 59 are stored.

The BBLSI 59 executes a calculation with the contents of the frequency setting register F_REG and the IF division ration setting register DIV_REG and transfers resulting control data to the RFIC 34. The transferred data DT is once held on the main data register MREG and, when an EN signal is issued from the BBLSI 59, the data DT is stored into specific data registers PREG 61. The frequency setting register F_REG and the IF division ratio setting register DIV_REG included in the control circuit 26, shown in FIG. 5, are specific data registers 61.

The control data DT, which is transferred from the BBLSI 59 by serial transmission, comprises an address field AAD in which the number of a specific data register is stored and a field DAT in which data to be written is stored. In this embodiment, switching the frequency division factor of the divider for generating IF local oscillation signals can be performed by a program and, thus, flexibility of algorithm is enhanced.

Embodiment 3

A third embodiment of the invention relates to a VCO calibration method that is suitable for an instance where the frequency division factor of the variable divider 22 included in the synthesizer SS is controlled, using sigma-delta (ΣΔ) modulators. This embodiment will be described with FIGS. 7 through 12.

Figure 7:
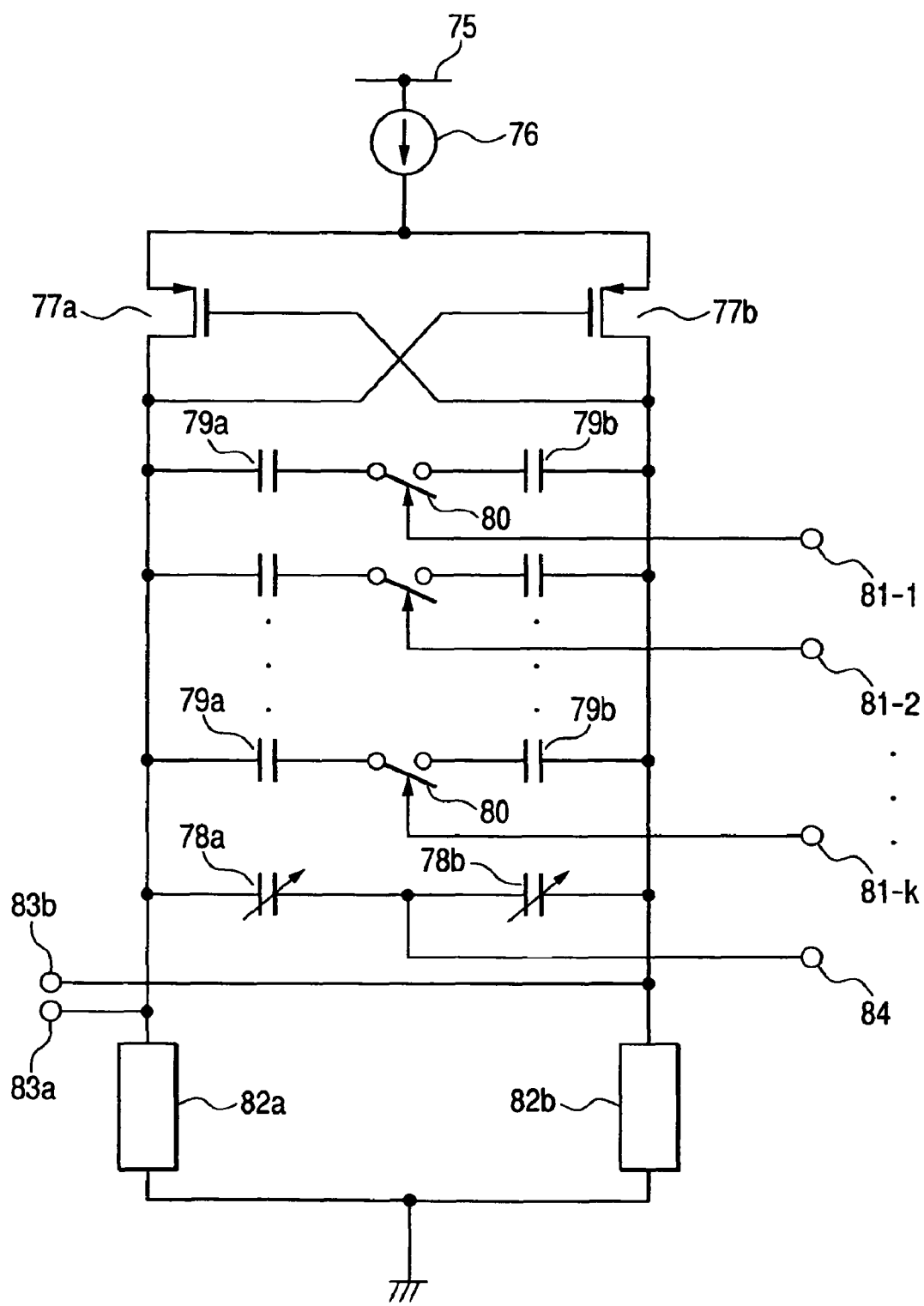
FIG. 7 is a diagram showing an example of a configuration of a voltage controlled oscillator that is used in a third embodiment of the invention.

In this embodiment, a VCO that is configured as shown in FIG. 7 is used. This VCO is a positive feedback type oscillator using PMOSFETs 77a, 77b which are controlled by a current source 76 from a power source 75. A control voltage is applied to a terminal 84 to control variable bias capacitors 78a, 78b. Oscillation frequency deviation which may occur due to variations in the PMOSFETs 77a, 77b, capacitors 78a, 78b, 79a, 79b, the amount of bias current, and inductors 82a, 82b is controlled by bias application from the k number of terminals 81-1 to 81-k, wherein the bias application is controlled by turning on/off switches 80, each connected between a pair of capacitors 79a, 79b. Terminals 83a, 83b are differential output terminals. Suffices a, b attached to the reference numbers of the elements indicate a pair of elements which ideally have identical characteristics.

Figure 8:
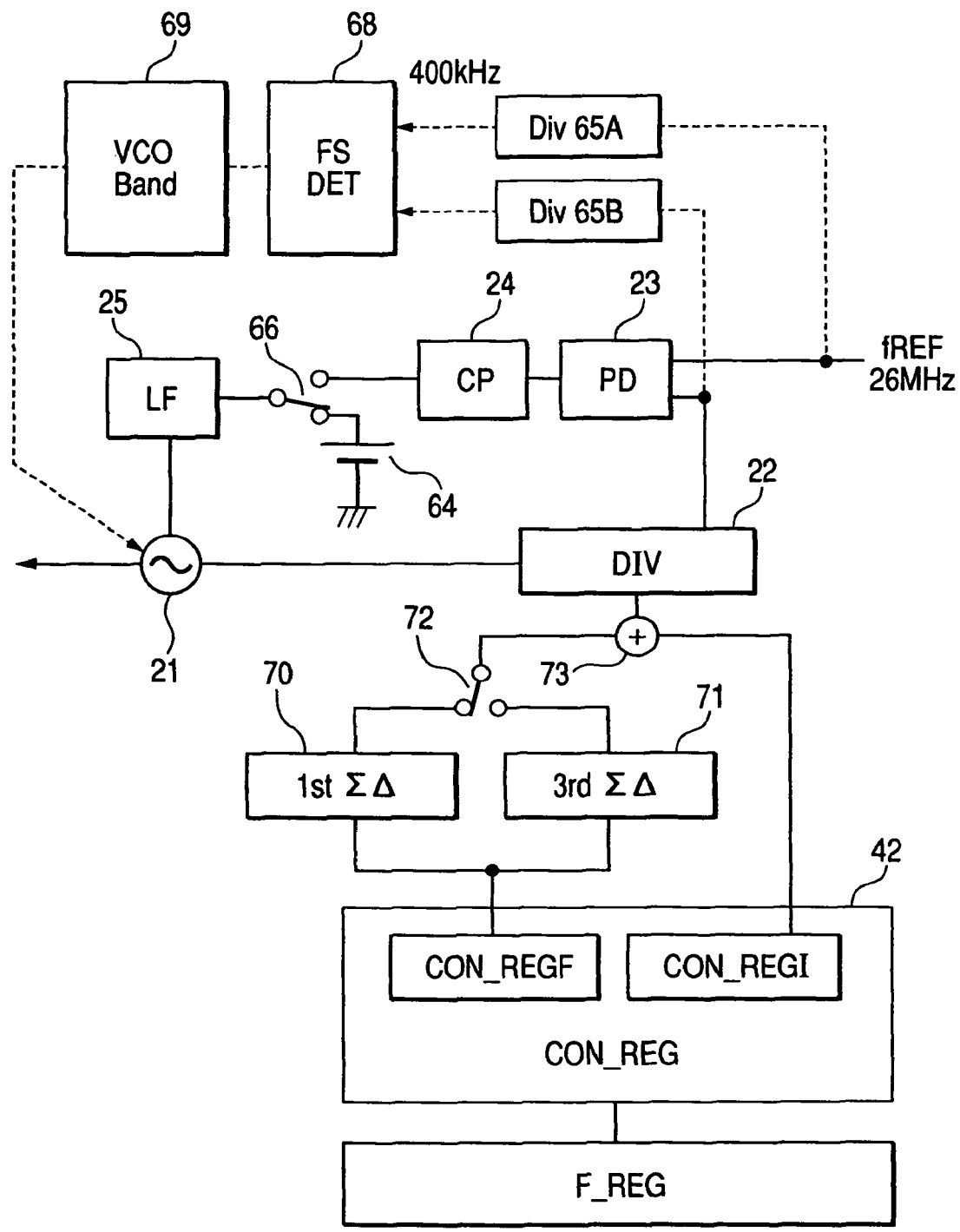
FIG. 8 is a diagram showing a circuit configuration for controlling the voltage controlled oscillator shown in FIG. 7

This control is executed by a circuit which is shown in FIG. 8. The output of a fixed bias generator 64, when it is connected by a switch 65, is applied through a loop filter 25 to a bias control terminal of the VCO 21. This opens the phase locked loop so that calibration can be performed. In order that the output of the variable divider 22 used in the synthesizer is consistent with the reference signal fREF (26 MHz), appropriate values are set for a sigma-delta (ΣΔ) input data register CON_REGF for first-order (1st) and third-order (3rd) sigma-delta (ΣΔ) modulators 70, 71 and a reference frequency multiplication setting register CON_REGI included in a division ratio setting register 42. The reference frequency multiplication setting register CON_REGI is a register in which a frequency division factor by which the reference frequency fREF is integrally multiplied must be set; for example, a frequency division factor corresponding to an integral multiple of fREF=26 MHz is stored. On the other hand, the sigma-delta (ΣΔ) input data register CON_REGF is a register in which a frequency pitch other than the above integral multiple must be set; for example, a pitch of 100 kHz is set as its value. This value is output via the first-order ΣΔ modulator 70 or third-order ΣΔ modulator 71 and added to the set value of the reference frequency multiplication setting register CON_REGI by an adder 73, and the result of the addition sets the frequency division factor of the variable divider 22. The first-order ΣΔ modulator 70 or third-order ΣΔ modulator 71 is selected by switch action of a switch 72.

To put it graphically, VCO calibration is performed through the paths denoted by dotted lines. First, the loop filter 25 is connected to the fixed bias generator 64 by the switch 66 and the PLL loop is disconnected. After the loop is opened, the output of the variable divider 22 and the reference frequency fREF are, respectively, divided into 400 kHz signals, for example, by divide-by-65 dividers Div65A, DiV65B. A speed comparator FSDET counts the cycles of the 400 kHz signals of both, namely, the divider output and fREF, and observes which is finished first.

In order that difference between the cycle counts of both becomes zero, that is, the capacitors 78a, 78b included in the VCO shown in FIG. 7 will have capacitances adapted to variations under the set bias condition, the values of the sigma-delta (ΣΔ) input data register CON_REGF and the reference frequency multiplication setting register CON_REGI are set. By a VCO band switching circuit (VCO Band) 69, the switches 80 in the VCO shown in FIG. 7 are switched so that the capacitances in accordance with the set values of these registers will be obtained, and a set control voltage, namely, a calibrated voltage is applied to the control terminals of the VCO 21. Then, by switch action of the switch 65, the loop filter 25 is connected to the charge pump 24; that is, the loop is closed, the calibration terminates, and stable VCO oscillation action under the PLL control continues. In this case, the use of the sigma-delta (ΣΔ) modulators gives rise to an error as will be described below.

Figure 9:
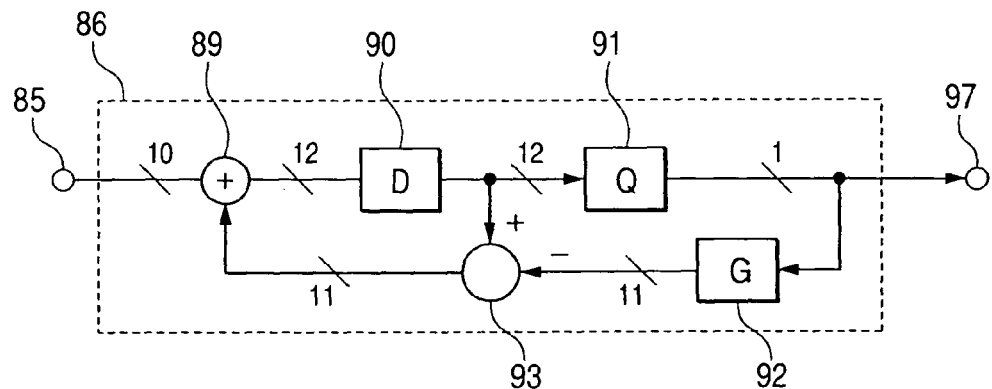
FIG. 9 is a diagram showing an example of a configuration of a first-order $\Sigma\Delta$ modulator that is used in the third embodiment of the invention.
Figure 10:
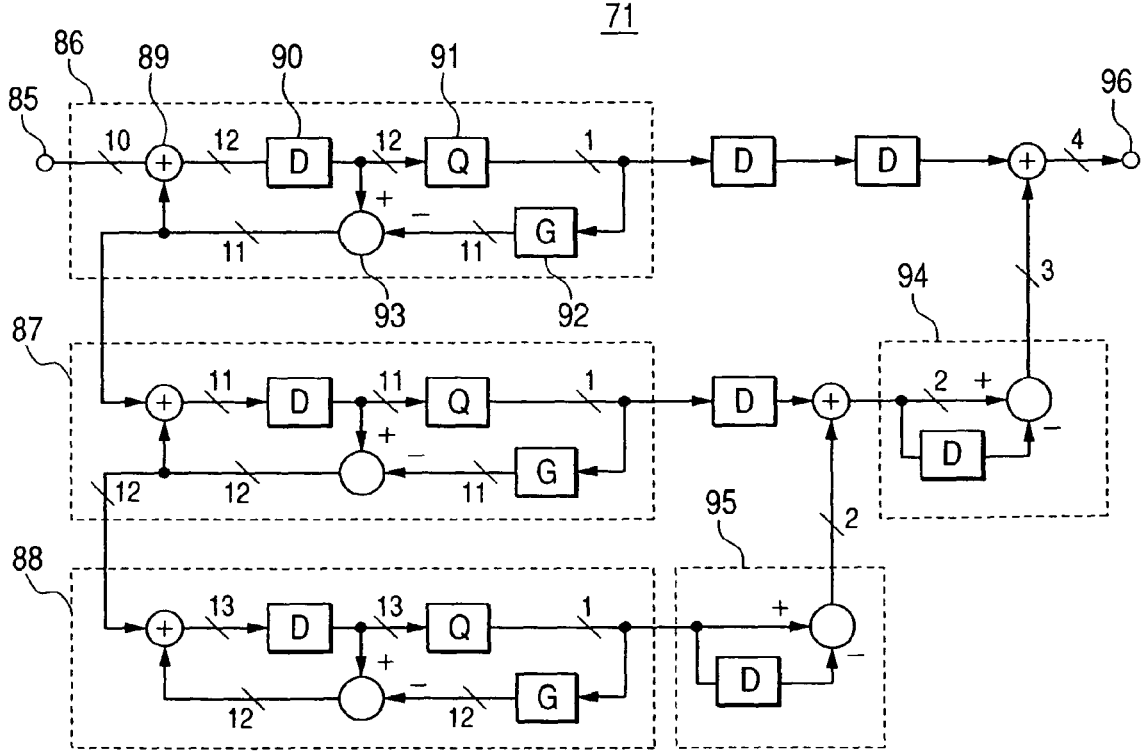
FIG. 10 is a diagram showing an example of a configuration of a third-order $\Sigma\Delta$ modulator that is used in the third embodiment of the invention.

FIG. 9 shows a configuration of the first-order ΣΔ modulator and FIG. 10 shows a configuration of the third-order ΣΔ modulator. The first-order ΣΔ modulator 70 is comprised of a delay element (D), 1-bit quantizer (Q), amplifier (G), and subtractor 93.

The thus configured first-order ΣΔ modulator 70 operates as follows. A fixed input, 10-bit digital signal input from an input terminal 85 is input to the delay element 90. This output result of the delay element 90 and the output of the delay element 90 which is the previous input to the quantizer are quantized to one bit by the 1-bit quantizer 91. The results are amplified by the amplifier 92 and a difference therebetween is obtained by the subtractor 93. The difference is added to a signal input to the input terminal by the adder 89 and the result of the addition is input to the delay element again. The output result of the delay element is quantized by the quantizer in the same way as above, thereby one-bit signals are generated, and these signals are then amplified and fed back. By repeating a series of these operations, a sequence of data (time-changing signals) as an average of values input at the input terminal 85 is output from a terminal 97.

The third-order ΣΔ modulator employs three first-order ΣΔ modulators 86, 87, 88 configured as above and differential elements 94, 95. It is configured as follows. The first-order ΣΔ modulators 86, 87, 88 are connected in series. The output of the third-stage ΣΔ modulator 88, after passing through a differential element 95, and the output of the second-stage ΣΔ modulator 87, after passing though one delay element, are added. The result of the addition, after passing through a differential element 94, is further added to the output of the first-stage ΣΔ modulator 86, after passing through two delay elements.

The third-order ΣΔ modulator 71 configured as above operates as follows. Essentially, the ΣΔ modulators of all stages operate in the same manner as described for the above first-order ΣΔ modulator. However, the first-stage modulator takes fixed input and operates in the same way as depicted in FIG. 9, but the second and third ΣΔ modulators 87, 88 take non-fixed input signals. An error produced by the first-stage ΣΔ modulator 86 is input to the second-stage ΣΔ modulator 87 and an error produced by the second-stage one is input to the third-stage one. Since a ΣΔ modulator works as an integrator intrinsically, the output of the third-stage ΣΔ modulator is reverted through the differential element 95 and added to the output of the second-stage one and this addition output is further reverted through the differential element 94 and added to the output of the first-stage one. As a result, a 4-bit sequence of data is output from a terminal 96. For adjustment of timing of addition, two delay elements are attached to the first-stage ΣΔ modulator 86 and one delay element is attached to the output side of the second-stage ΣΔ modulator 87.

For the first-order ΣΔ modulator, its output involves an error within ±0.5 (1 bit) for one operation, whereas the output of the third-order ΣΔ modulator involves an error within ±7 (4 bit). It is understood that a lower-order modulator is desirable. Therefore, in the configuration of FIG. 8, by switch action of the switch 72, the third-order ΣΔ modulator 71 shown in FIG. 10 is selected when the synthesizer operation is performed and the first-order ΣΔ modulator 70 is selected when calibration is performed.

Figure 11:
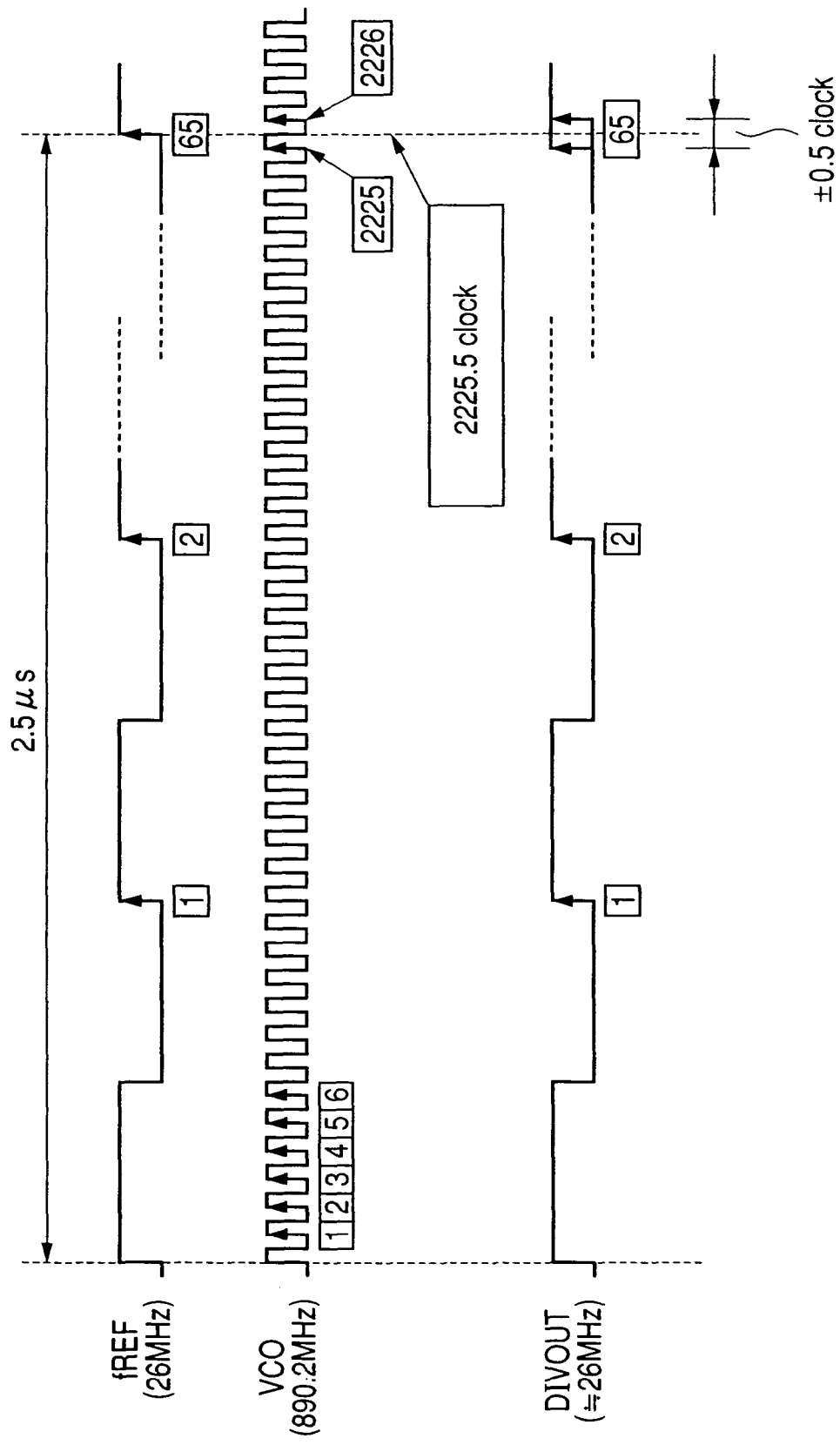
FIG. 11 is a timing chart of signals to explain the precision of counting signal cycles of the oscillator in the third embodiment of the invention.

FIG. 11 shows a timing chart of signals to explain an error involved when the VCO is conditioned to generate local oscillation signals with 890.2 MHz and the first-order ΣΔ modulator is used. FIG. 11 shows the pulses of reference frequency fREF of 26 MHz, oscillation frequency of 890.2 MHz that the VCO 21 generates, and output DIVOUT of the variable divider 22 during a period of 2.5 μs. In FIG. 11, cycles are numbered and boxed. 65 cycles of pulses of fREF (hereinafter, cycles are referred to as "clocks") occur during 2.5 μs, corresponding to 2225.5 clocks of VCO. At the frequency of the output DVOUT of the divide-by-65 divider (Div65B) when the first-order ΣΔ modulator 70 is used, 2225.5±0.5 clocks occur for the corresponding period, indicating an error of ±0.5 clock from the VCO oscillation frequency.

FIG. 12 shows a table listing calculation results for other major frequencies. In the table shown in FIG. 12, CH is a GSM channel number, f is applied frequency [MHz], Ni is the value of the reference frequency multiplication setting register CON_REGI, Nf is the value of the sigma-delta (ΣΔ) modulator input data register CON_REGF, THEO is a theoretical value [clocks], ΣΔ (min) is a minimum value of the first-order ΣΔ modulator, ΣΔ (max) is a maximum value of the first-order ΣΔ modulator, TMERR (max) is a maximum timing error [clock], and TMERRO (min) is a minimum timing error [clock]. From this table, an error within 0.5 clock is verified for all channels.

Embodiment 4

Figure 13:
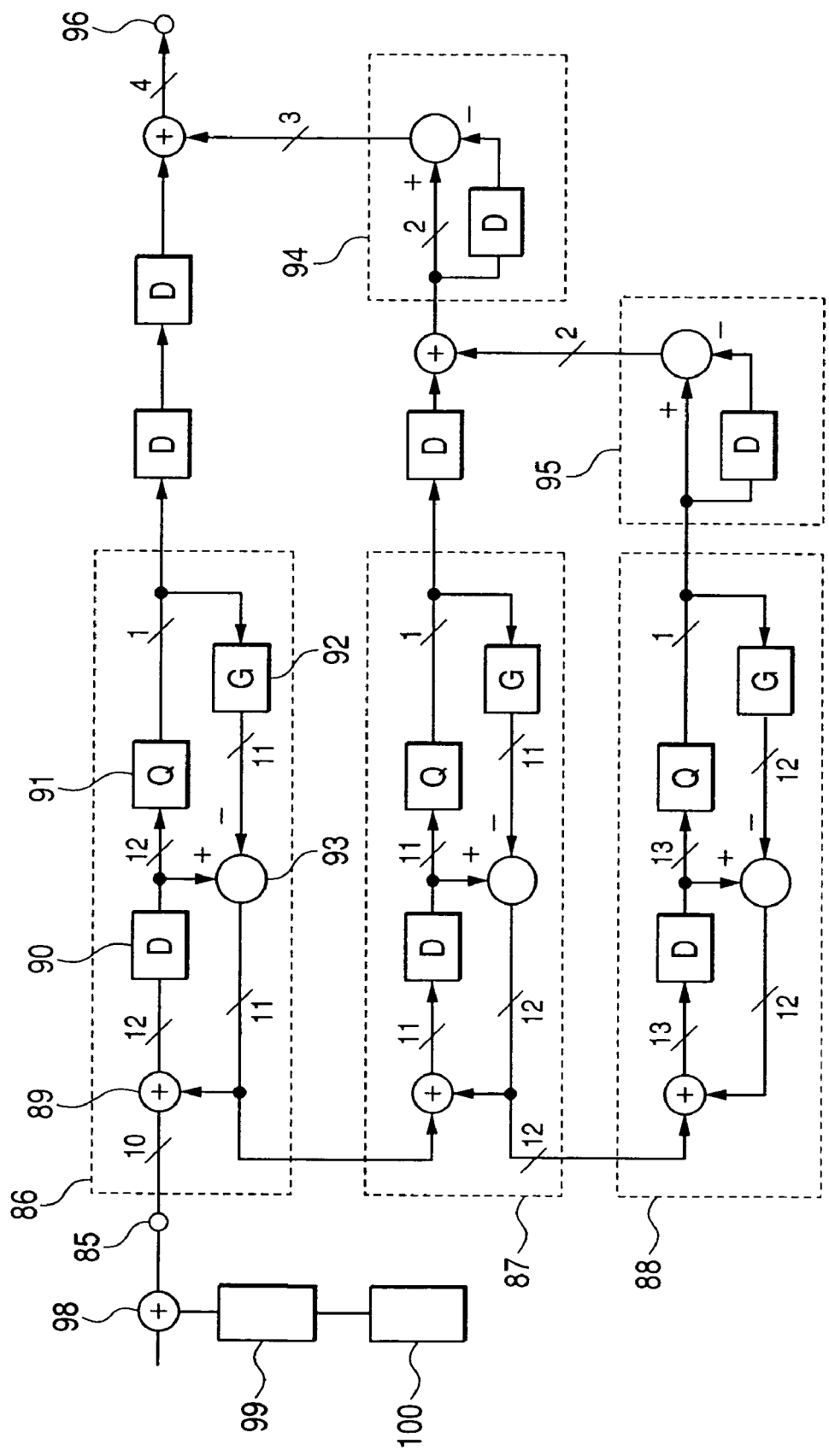
FIG. 13 is a diagram showing a third-order ΣΔ modulator with a pseudo random number generator, which is a fourth embodiment of the invention.

A fourth embodiment relates to a modulator configuration in which a pseudo random number is added to reduce fixed spurious of the ΣΔ modulator. This embodiment will be described with FIGS. 13 through 17. FIG. 13 shows a third-order ΣΔ modulator that is used in this embodiment. Components corresponding to those of the third-order ΣΔ modulator shown in FIG. 10 are assigned the same reference numbers and their explanation is not repeated. A difference from the modulator configuration shown in FIG. 10 is that an adder 98 is attached to the input of the third-order ΣΔ modulator and output of a pseudo random number generator 100 is applied via a differential element 99 to cut DC components.

Figure 14:
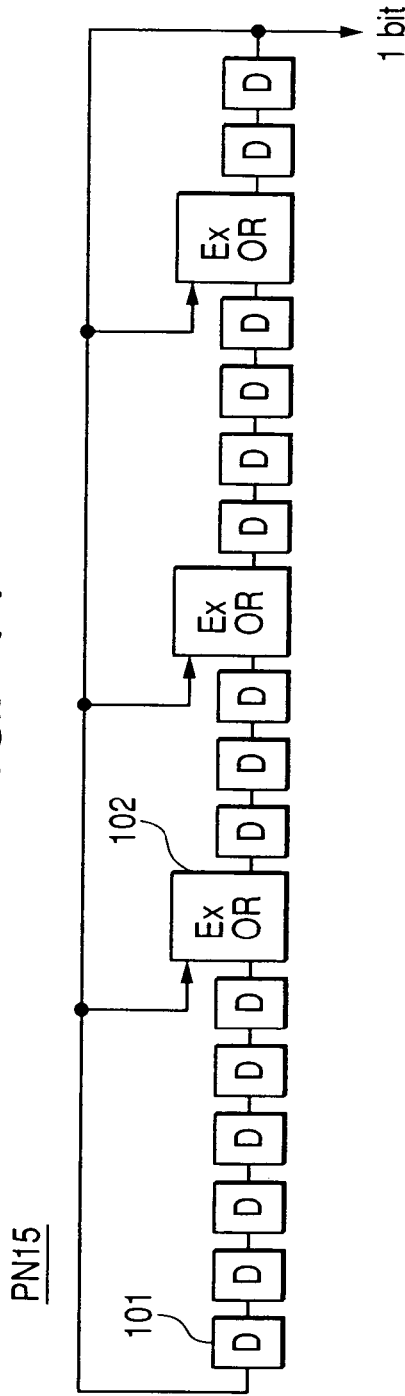
FIG. 14 is a diagram showing an example of a configuration of the pseudo random number generator that is used in the fourth embodiment of the invention.
Figure 15:
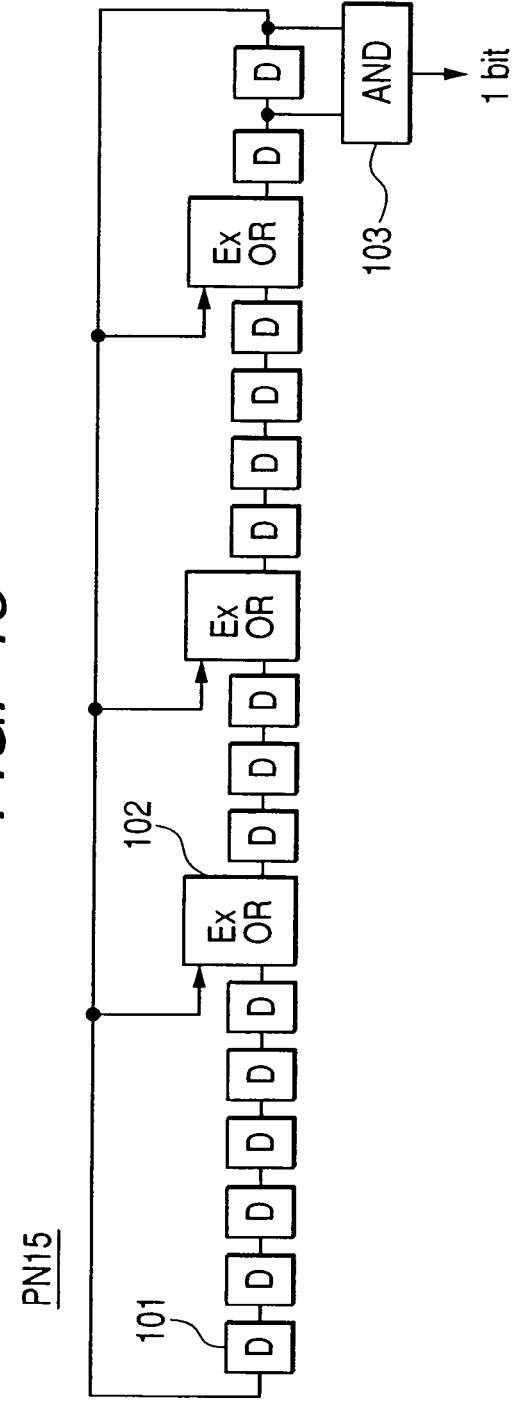
FIG. 15 is a diagram showing another example of a configuration of the pseudo random number generator that is used in the fourth embodiment of the invention.

It is important here is to prevent a frequency error by eliminating DC components. FIG. 14 shows an example of a configuration of the pseudo random number generator 100. This pseudo random number generator, which is called PN15, is comprised of 15 delay elements 101 and three exclusive OR elements 102. As shown in FIG. 15, by AND 103 operation of the outputs of two delay elements, an error probability of 1 is controlled and noise power can be reduced by, for example, a factor of 4.

Figure 16:
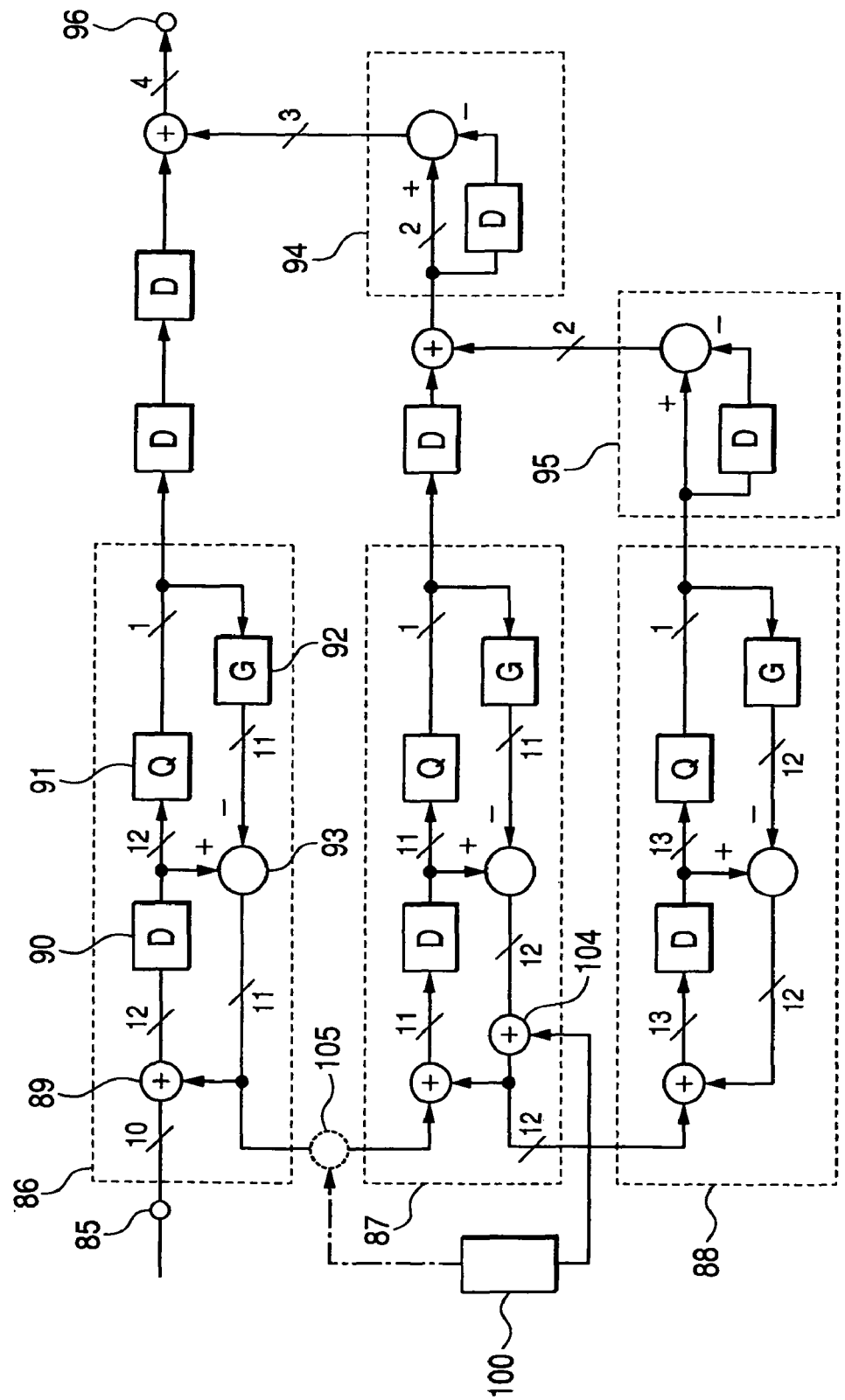
FIG. 16 is another configuration of a third-order ΣΔ modulator with a pseudo random number generator, which is the fourth embodiment of the invention.
Figure 17:
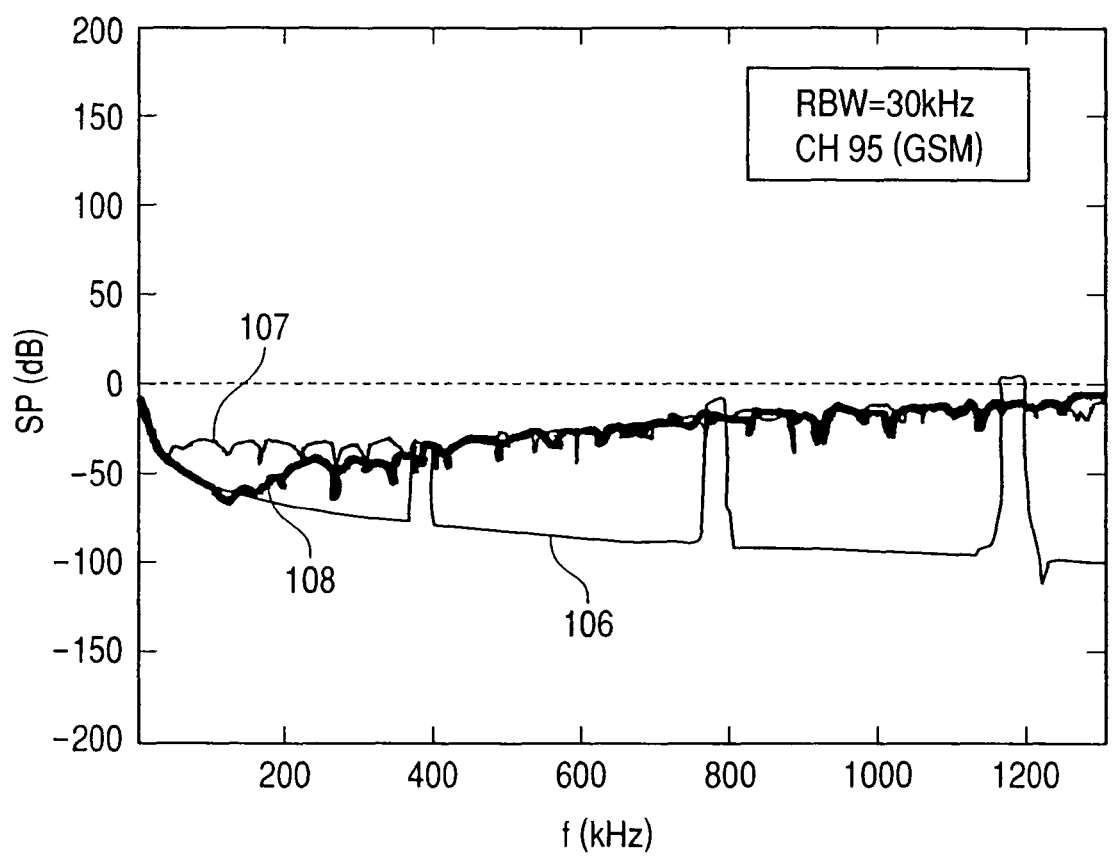
FIG. 17 is a graph of characteristic lines to demonstrate the result of the fourth embodiment of the invention.

As shown in FIG. 16, by applying the output of the pseudo random number generator 100 to an adder 104 or an adder 105 (denoted by a dotted circle) that is attached to the input of the second-stage ΣΔ modulator, the differential element 99 in FIG. 13 can be dispensed with. FIG. 17 shows a spectral analyzer display, a graph of characteristic lines as results of simulation of GSM channel number 95 by a spectral analyzer, where a reference band width RBW=30 kHz. The ordinate represents spectrum power level SP (dB) and the abscissa represents frequency f (kHz). A characteristic line 106 is the one observed when the modulator configuration of FIG. 10 where a pseudo random number is not applied is used and spurious appears. On the other hand, as seen in a characteristic line 107 observed when the modulator circuitry of FIG. 13 where a random pseudo number is applied is used and a characteristic line 108 observed when the modulator circuitry of FIG. 16 is used, it is apparent that spurious is suppressed.

Embodiment 5

Figure 18A:
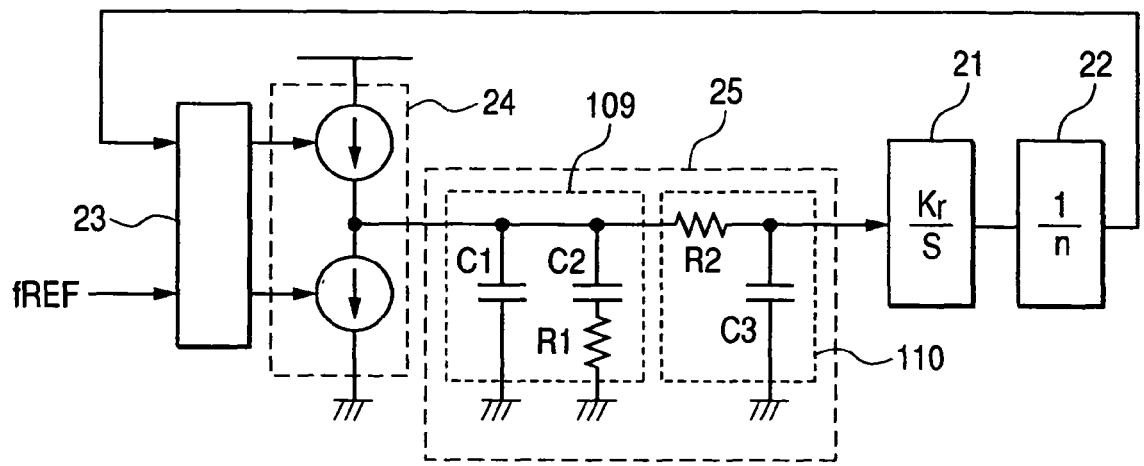
FIG. 18A is a circuit diagram wherein a loop filter is ideally grounded, according to a fifth embodiment of the invention.

In this embodiment, influence of the package on an internal loop filter of the ΣΔ modulator is discussed. FIG. 18A shows a synthesizer comprised of the VCO 21, phase discriminator 23, charge pump circuit 24, and loop filter 25. The loop filter 25 is comprised of a lag-lead filter 109 consisting of parallel connections of a circuit in which a capacitor C2 and a resistor R1 are connected in series and a capacitor C1, and a low-pass filter 110 consisting of a resistor R2 and a capacitor C3. In FIG. 18A, Kv/S denotes a transfer function of the VCO 21 and 1/n denotes a frequency division factor of the variable divider 22.

Although an example where the first-order low-pass filter is used is shown in this embodiment, it is needless to say that low-pass filters more than the first-order may be used.

Figure 18B:
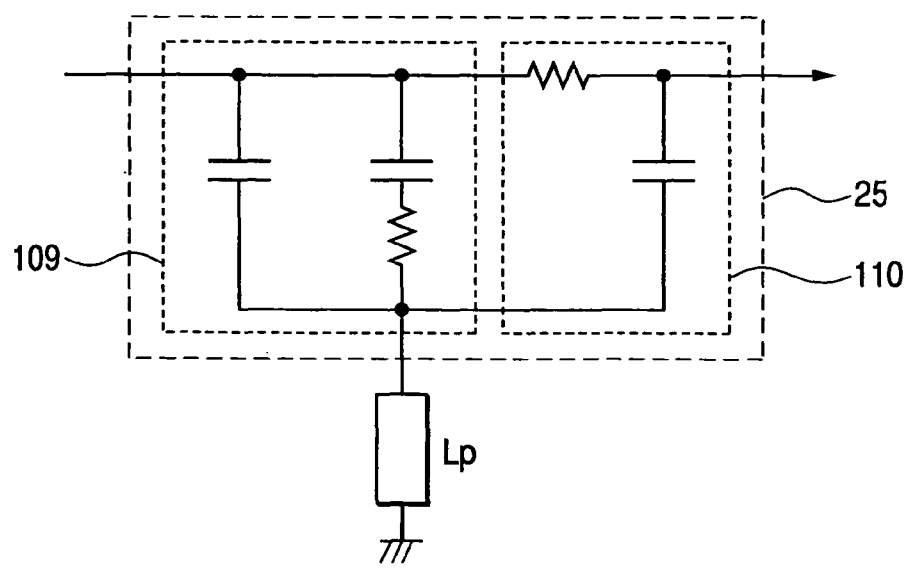
FIG. 18B is a circuit diagram wherein the loop filter is connected to a common ground on the package.
Figure 18C:
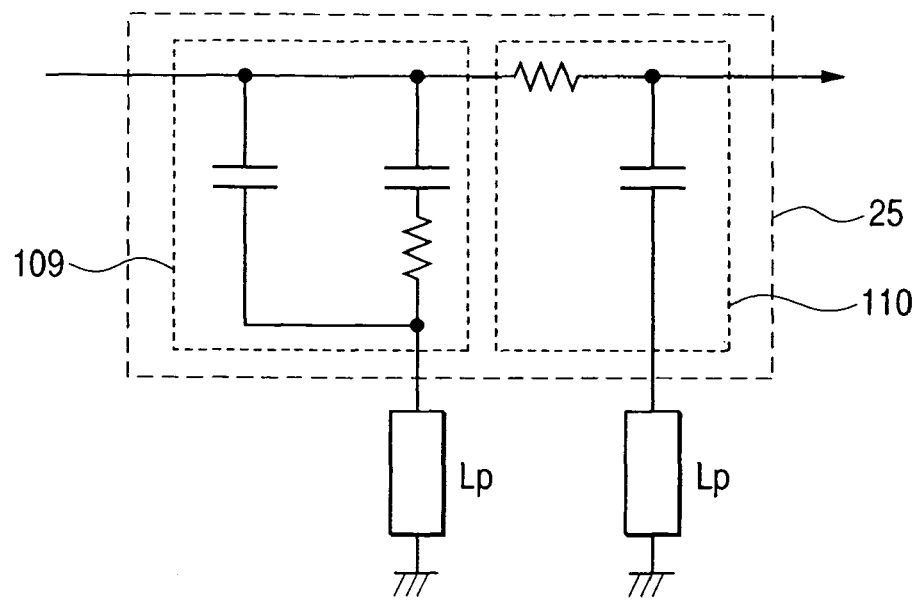
FIG. 18C is a circuit diagram wherein a lag-lead filter and a low-pass filter are connected to separate grounds on the package.
Figure 18D:
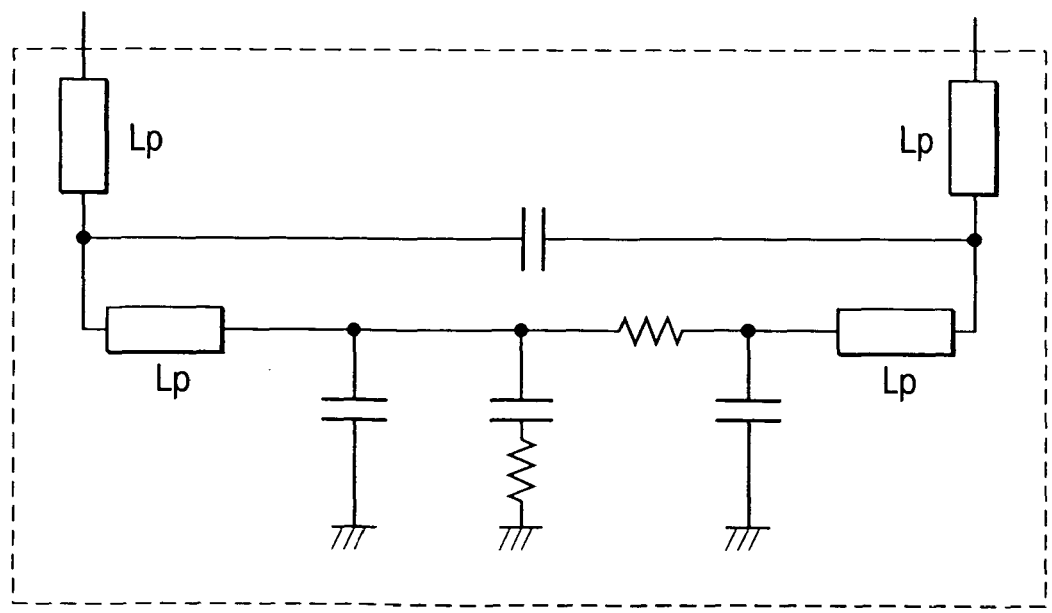
FIG. 18D is a circuit diagram wherein the whole loop filter is mounted out of the package.

FIG. 18A is an example where ideal grounding is accomplished. FIG. 18B shows an example where the loop filter is connected to a common ground. FIG. 18C shows an example where the lag-lead filter 109 and the low-pass filter 110 are connected to separate grounds; that is, the lag-lead filter 109 is grounded to the ground terminal for the charge pump 24 and the low-pass filter 110 is grounded to the ground terminal for the VCO 21. FIG. 18D shows an example where the whole loop filter is mounted out of the package. In FIGS. 18B to 18D, parasitic inductors Lp in the package are added.

Figure 19:
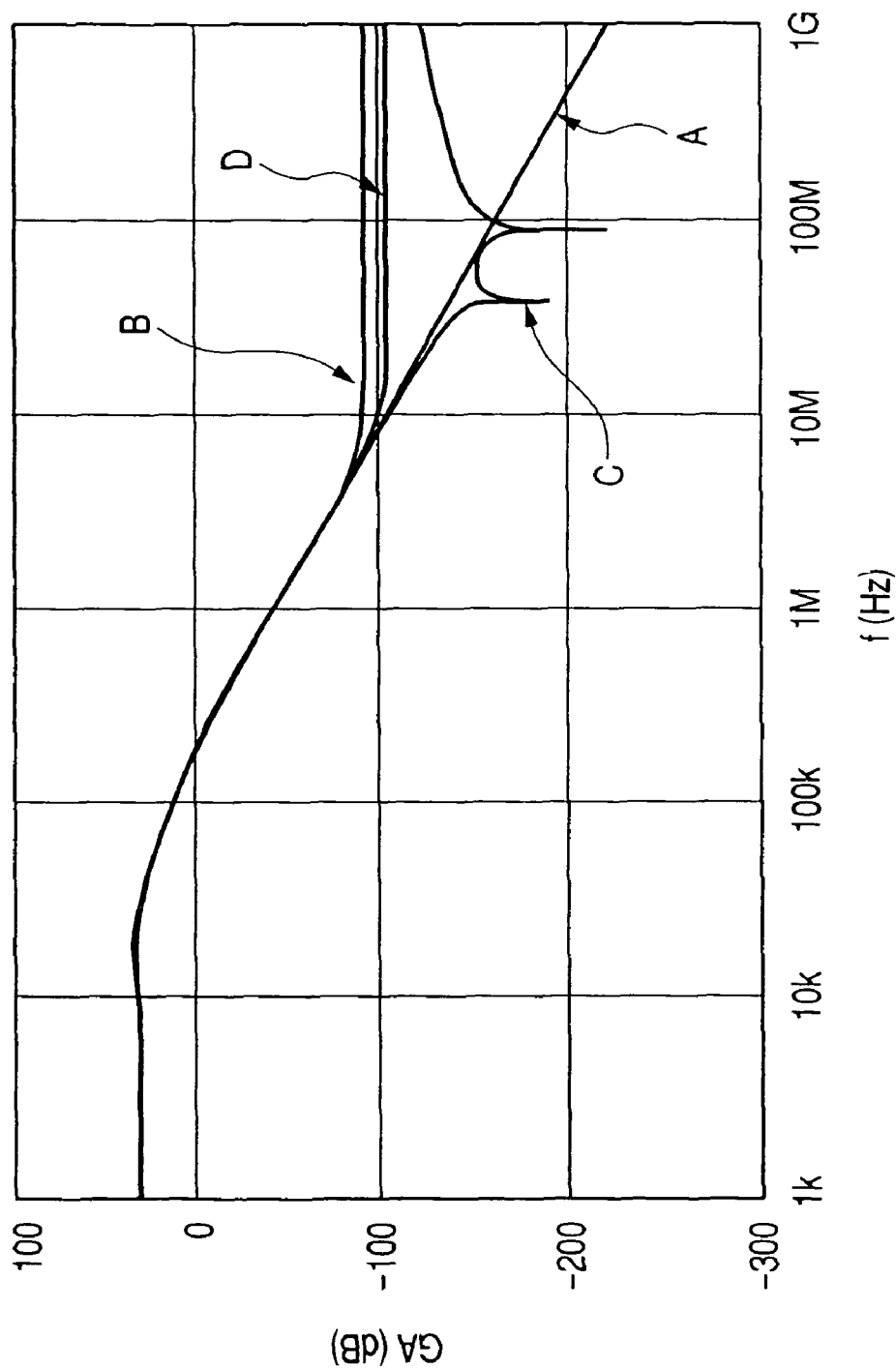
FIG. 19 is a graph to demonstrate the effect of the fifth embodiment.

FIG. 19 shows a graph of gain frequency characteristic curves observed respectively for the grounding schemes of FIGS. 18A to 18D, wherein marks A to D correspond to FIGS. 18A to 18D. In FIG. 19, the ordinate represents gain GA (dB) and the abscissa represents frequency f (Hz). From FIG. 19, it is apparent that, for the grounding schemes of FIGS. 18B and 18D, the attenuation effect is restricted, affected by the inductors Lp in the package, but such restriction can be lessened by using separate grounds as shown in FIG. 18C.

Embodiment 6

Figure 20:
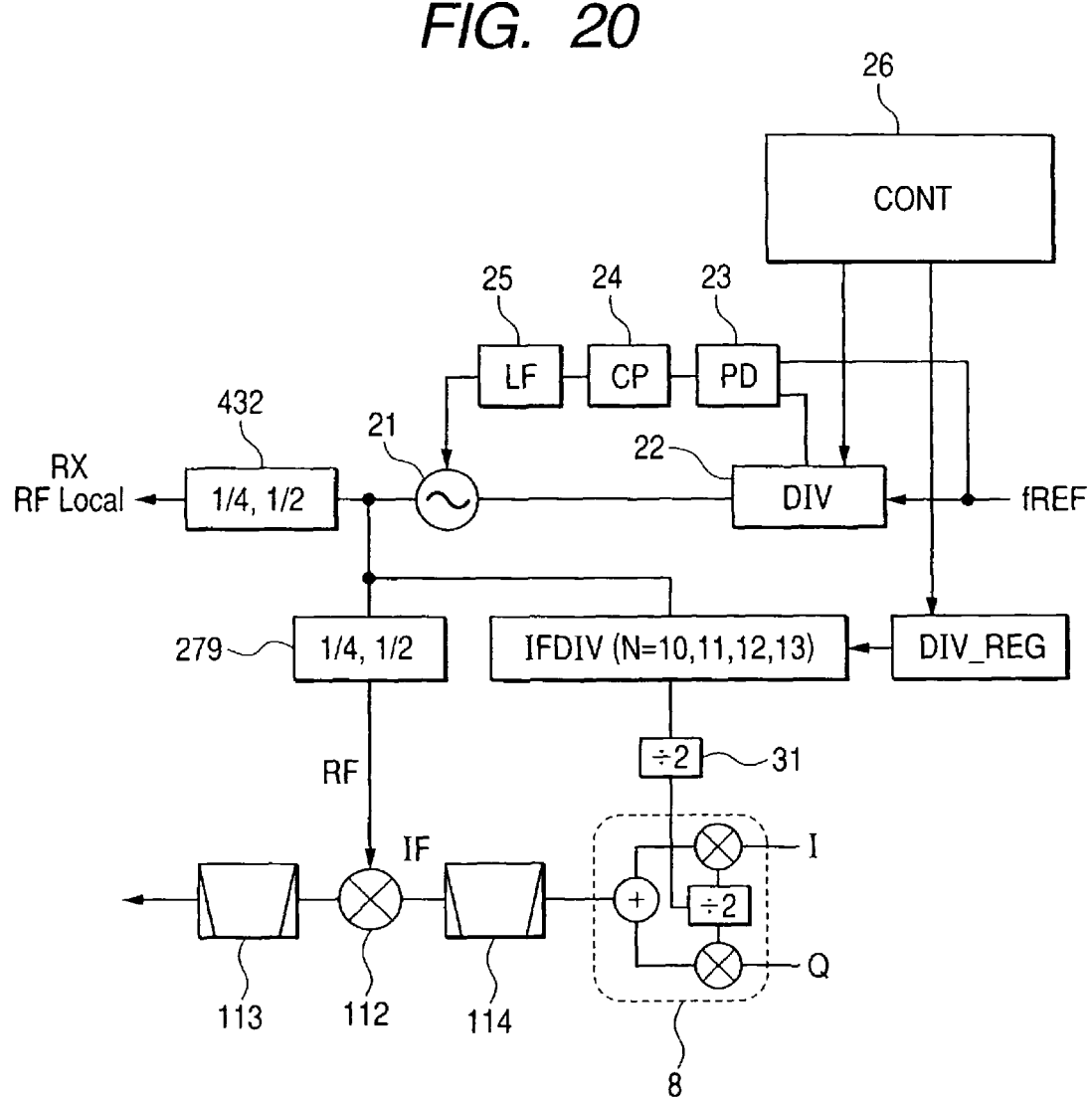
FIG. 20 is a diagram showing a sixth embodiment of the invention.

While the foregoing embodiments has mostly discussed the offset PLL, a sixth embodiment relates to the application of the invention to a two-step transmitter which is shown in FIG. 20. Here, the circuit configuration shown in FIG. 3 is applied. Components corresponding to those shown in FIG. 3 are assigned the same reference numbers and their explanation is not repeated. In this embodiment, instead of the offset PLL section O-PLL in FIG. 3, a transmission frequency band TX section is comprised of a transmitting mixer 112, an RF band-pass filter 113, and an IF band-pass filter 114, which differs from the circuitry of FIG. 3. As is the case for the circuitry of FIG. 3, in this embodiment as well, the VCO 21 included in the synthesizer SS used for local oscillation for the receiver is also used to generate RF local signals for transmission and IF local signals to drive the quadrature modulator 8.

Output of the quadrature modulator 8 passes through the IF band-pass filter 114 and is input to one input of the mixer 112 and an RF local signal generated by frequency-dividing the output from the VCO 21 under control of the control circuit 26 is input to the other input of the mixer. Output of the mixer 112 passes through the RF band-pass filter 113 and a transmission frequency band signal is generated. As a matter of course, the operation for avoiding transmission spurious, explained with FIG. 2, is performed, and, by using the VCO for both receiving and transmission, the IC will be downsized.

While the preferred embodiments of the present invention have been described, focusing the transceiver on a mobile phone for use in Europe, it will be appreciated that the present invention is not limited to the above embodiments and various design changes may be made without departing from its spirit and scope. For instance, of course, the present invention can be applied to mobile phones of other types such as those for CDMA system and wireless LAN or the like.

According to the present invention, a single PLL synthesizers serves as both RF frequency band PLL and IF frequency band PLL; therefore, the number of necessary oscillators can be reduced and the wireless transmitter is downsized.

What is claimed is:
1. A wireless transmitter circuit comprising:
a frequency-generating circuit;
a quadrature modulator;
a first frequency-converting phase-locked loop circuit to which an output of said quadrature modulator is input;
a first variable divider; and
a second variable divider associated with said frequency-generating circuit,
wherein an output of said frequency-generating circuit is supplied via said first variable divider to said quadrature modulator as a local oscillation signal for said quadrature modulator,
wherein said output of said frequency-generating circuit is supplied directly or via a third variable divider to said first frequency-converting phase-locked loop circuit as a local oscillation signal for said first frequency-converting phase-locked loop circuit, and
wherein a frequency division factor of said first variable divider is set to a variable number,
wherein said first frequency-converting phase-locked loop circuit comprises
a first phase discriminator with first and second input terminals;
a first loop filter circuit to which an output of said first phase discriminator is input;
a first voltage controlled oscillator with a voltage control terminal to which an output of said first loop filter circuit is input; and
a first mixer to which an output of said first voltage controlled oscillator is input,
wherein an output of said first mixer is connected to said second input terminal of said first phase discriminator, and
wherein an input of said first frequency-converting phase-locked loop circuit is supplied to the first input terminal of said first phase discriminator,
wherein said frequency-generating circuit is formed by a phase-locked loop circuit comprising a second voltage controlled oscillator, the second variable divider, a second phase discriminator, a charge pump circuit, and a second loop filter circuit,
wherein said frequency-generating circuit is a fractional phase-locked loop oscillation circuit in which a frequency division factor of said second variable divider is time changing,
wherein the second voltage controlled oscillator is constructed such that its output is commonly used by the quadrature modulator and the first mixer, and
wherein the frequency division factor of the first variable divider and a frequency division factor of the third variable divider are commonly controlled to vary in mutual coordination with each other, such that a frequency of the local oscillation signal for said first frequency-converting phase-locked loop circuit is separated from a harmonic frequency of a reference frequency of said frequency-generating circuit in a predetermined range of a transmission frequency by selectively changing the frequency division factors of the first and third variable dividers to avoid generating a spurious signal component.

2. The wireless transmitter circuit according to claim 1, wherein said frequency-generating circuit further comprises:
a bias element which supplies a fixed potential to a voltage control input of said second voltage controlled oscillator;
a switch element for switching from one resonant frequency of said second voltage controlled oscillator to another;
a circuit to determine connection/disconnection of said switch element for resonant frequency switching;
a first sigma-delta modulator which controls said frequency division factor of said second variable divider; and a second sigma-delta modulator of higher order than said first sigma-delta modulator, wherein said first sigma-delta modulator is used during phase-locked loop operation of said frequency-generating circuit, and wherein said second sigma-delta modulator is used during calibration operation of said frequency-generating circuit.

3. The wireless transmitter circuit according to claim 1, wherein setting a division ratio of said second variable divider of said phase-locked loop circuit is performed by a circuit comprising:

a first sigma-delta modulator;
a first adder;
a second adder;
a first frequency condition setting register;
a second frequency condition setting register; and
a first pseudo random number generator, wherein an output of said first adder is connected to a division ratio setting terminal of said second variable divider, wherein a first input terminal of said first adder is connected to an output of said first sigma-delta modulator and a second input terminal thereof is connected to a predetermined upper bit sequence output of said first frequency condition setting register, wherein an input of said first sigma-delta modulator is connected to an output of said second adder, wherein a first input terminal of said second adder is connected to a predetermined lower bit sequence output of said second frequency condition setting register, wherein a second input terminal of said second adder is connected to said first pseudo random number generator, and wherein DC components are eliminated from an output of said pseudo random number generator.

4. The wireless transmitter circuit according to claim 1, wherein a circuit for setting a division ratio of said second variable divider comprises:

a first sigma-delta modulator;
a first adder;
a first frequency condition setting register;
a second frequency condition setting register;
a first pseudo random number generator; and
first and second differential elements, wherein an output of said first adder is connected to a division ratio setting terminal of said second variable divider, wherein a first input terminal of said first adder is connected to an output of said first sigma-delta modulator and a second input terminal of said first adder is connected to a predetermined upper bit sequence output of said first frequency condition setting register, wherein an input of said first sigma-delta modulator is connected to a predetermined lower bit sequence output of said second frequency condition setting register, wherein said first sigma-delta modulator comprises first, second, and third first-order sigma-delta modulators, each having an input terminal, an output terminal and an error output terminal, wherein the error output terminal of said first first-order sigma-delta modulator is connected to the input terminal of said second first-order sigma-delta modulator, wherein the output terminal of said second first-order sigma-delta modulator is connected via said first differential element to the output terminal of said first first-order sigma-delta modulator, wherein the error output terminal of said second first-order sigma-delta modulator is connected to the input terminal of said third first-order sigma-delta modulator, wherein the output terminal of said third first-order sigma-delta modulator is connected via said second differential element to the output terminal of said second first-order sigma-delta modulator, and wherein an output of said first pseudo random number generator is added to an error output of said first first-order sigma-delta modulator, and the addition result is input to said second first-order sigma-delta modulator.

5. The wireless transmitter circuit according to claim 1, wherein said second loop filter circuit comprises at least a first lag-lead filter which comprises parallel connections of a first circuit comprising a first capacitor and a first resistor connected in series and a second capacitor, and one of a first low-pass filter and a higher order filter, wherein an output of said charge pump circuit is connected to a first terminal of said first lag-lead filter and an input terminal of said first low-pass filter, wherein a second terminal of said first lag-lead filter is connected to a ground terminal of said charge pump circuit, and wherein an output terminal of said first low-pass filter is connected to a voltage control terminal of said second voltage controlled oscillator and a ground terminal of said first low-pass filter is connected to a ground terminal of said second voltage controlled oscillator.

6. The wireless transmitter circuit according to claim 1, wherein the frequency division factor of said first variable divider is set to an even number to generate two local oscillation signals with a phase difference of 90 degrees which are input to said quadrature modulator.

7. A transceiver comprising a wireless transmitter circuit which transmits a transmit signal from a baseband processing section through an antenna and a receiver circuit which, after interference is removed by a filter circuit from a signal received by the antenna, is amplified by a low noise amplifier, frequency converts the signal into baseband signals and sends the baseband signals to the baseband section, said wireless transmitter circuit comprising:
a frequency-generating circuit;
a quadrature modulator;
a first frequency-converting phase-locked loop circuit to which an output of said quadrature modulator is input;
a first variable divider; and
a second variable divider associated with said frequency-generating circuit, wherein an output of said frequency-generating circuit is supplied via said first variable divider to said quadrature modulator as a local oscillation signal for said quadrature modulator, wherein said output of said frequency-generating circuit is supplied directly or via a third variable divider to said first frequency-converting phase-locked loop circuit as a local oscillation signal for said first frequency-converting phase-locked loop circuit, wherein a frequency division factor of said first variable divider is set to a variable, wherein said frequency-generating circuit is formed by a phase-locked loop circuit comprising a second voltage controlled oscillator, the second variable divider, a second phase discriminator, a charge pump circuit, and a second loop filter circuit, wherein said frequency-generating circuit is a fractional phase-locked loop oscillation circuit in which a frequency division factor of said second variable divider is time changing, wherein said first frequency-converting phase-locked loop circuit comprises a first mixer, wherein the second voltage controlled oscillator is constructed such that its output is commonly used by the quadrature modulator and the first mixer, and wherein the frequency division factor of the first variable divider and a frequency division factor of the third variable divider are commonly controlled to vary in mutual coordination with each other, such that a frequency of the local oscillation signal for said first frequency-converting phase-locked loop circuit is separated from a harmonic frequency of a reference frequency of said frequency-generating circuit in a predetermined range of a transmission frequency by selectively changing the frequency division factors of the first and third variable dividers to avoid generating a spurious signal component.

* * * * *